US 8,046,551 B1

(12) United States Patent
Sahin

(10) Patent No.: US 8,046,551 B1
(45) Date of Patent: Oct. 25, 2011

(54) TECHNIQUES FOR PROCESSING I/O REQUESTS

(75) Inventor: Adnan Sahin, Needham, MA (US)

(73) Assignee: EMC Corporation, Hopkinton, MA (US)

( * ) Notice: Subject to any disclaimer, the term of this patent is extended or adjusted under 35 U.S.C. 154(b) by 591 days.

(21) Appl. No.: 12/228,647

(22) Filed: Aug. 14, 2008

(51) Int. Cl.
*G06F 11/20* (2006.01)
*G06F 12/00* (2006.01)
(52) U.S. Cl. ............... 711/162; 711/165; 714/E11.107; 714/707
(58) Field of Classification Search .......... 711/162, 711/114, 112, 165; 714/707, E11.107, E11.106
See application file for complete search history.

(56) References Cited

U.S. PATENT DOCUMENTS

| | | | |
|---|---|---|---|
| 5,206,939 A | | 4/1993 | Yanai et al. |
| 5,778,394 A | | 7/1998 | Galtzur et al. |
| 5,845,147 A | | 12/1998 | Vishlitzky et al. |
| 5,857,208 A | | 1/1999 | Ofek |
| 7,240,238 B2 * | | 7/2007 | Yanai et al. ............... 714/6.32 |
| 2008/0086585 A1 * | | 4/2008 | Fukuda et al. ............ 711/100 |
| 2008/0117548 A1 * | | 5/2008 | Azuma et al. ............ 360/135 |
| 2009/0067303 A1 * | | 3/2009 | Poo et al. ................ 369/47.34 |

OTHER PUBLICATIONS

Patterson et al., "Introduction to Redundant Arrays of Inexpensive Disks (RAID)," COMPCON 89 Proceedings, Feb. 27-Mar. 3, 1989, IEEE Computer Society, pp. 112-117.*
Patterson et al., "A Case for Redundant Arrays of Inexpensive Disks (RAID)," Report No. UCB/CSD 87/391, Computer Science Division (EECS), University of California, Berkeley, California, Dec. 1987, pp. 1-24.*
U.S. Appl. No. 12/215,432, filed Jun. 27, 2008, Chilton, et al.

* cited by examiner

*Primary Examiner* — Pierre-Michel Bataille
(74) *Attorney, Agent, or Firm* — Muirhead and Saturnelli, LLC

(57) ABSTRACT

Described are techniques executed in a data storage system in connection with processing an I/O request. The I/O request is received. It is determined whether the I/O request is a write request. If the I/O request is a write request, write request processing is performed. The write request processing includes: copying write request data of the write request to cache; destaging the write request data from the cache to a primary storage device; and copying, in accordance with a heuristic, the write request data from the primary storage device to an asynchronous mirror device including an asynchronous copy of data from the primary storage device, wherein the asynchronous mirror device is write disabled with respect to received write requests requesting to write data thereto, the asynchronous mirror device used for servicing data requested in connection with read requests upon the occurrence of a cache miss.

20 Claims, 13 Drawing Sheets

TECHNIQUES FOR PROCESSING I/O REQUESTS

BACKGROUND

1. Technical Field

This application generally relates to data storage, and more particularly to techniques used in connection with processing I/O requests.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored on magnetic disk devices (as described above), tape devices and/or flash memory devices. In connection with flash memory devices, two technologies used may be referred to as single level cell (SLC) and multi-level cell (MLC). Both SLC and MLC flash devices may fail primarily due to wear out or usage after performing a certain number of programming or erase-write cycles to store data on the flash memory devices. For example, a flash memory device that uses NAND flash memory and is an SLC device is expected to perform a specified number of erasures of a cell. After performing the specified number of erasures to the cell, that cell is expected to fail or wear out. Cells wear out in that they cannot hold the electrical charge that defines the value of the bit stored when programming or writing to the cell. Failure of a cell may be detected when attempting to subsequently read data therefrom. As such, different techniques may be used when performing operations in connection with the flash memory device. One technique is to use an error correction code (ECC) to allow recovery of data upon the occurrence of a write failure. Reading a data value from a worn out cell results in an incorrect data value being read as may be determined in connection with performing data integrity processing internal to the flash memory device, for example, using the ECC. Another technique is wear leveling which attempts to balance or evenly distribute writes across the physical device locations. Thus, when performing a write operation to a flash memory device, the write operation may be performed to a logical location on the device which is then mapped to a physical location on the device. With wear leveling and flash memory devices, the particular physical location for the same logical location may change in accordance with a mapping of virtual to physical locations in order to achieve the desired equal distribution of writes across physical locations of the device.

Different costs and characteristics are associated with different memory technologies such as, for example, each of the SLC and MLC flash memory technologies. Devices using SLC technology typically provide higher durability (e.g., larger number of erase-write cycles expected prior to failure) and better random write performance than MLC devices. However, SLC devices are also more expensive and may be characterized as providing less storage density in comparison to MLC devices.

SUMMARY OF THE INVENTION

In accordance with one aspect of the invention is a method executed in a data storage system in connection with processing an I/O request, the method including: receiving the I/O request; determining whether the I/O request is a write request; and if the I/O request is a write request, performing write request processing including: copying write request data of the write request to cache; destaging the write request data from the cache to a primary storage device; and copying, in accordance with a heuristic, the write request data from the primary storage device to an asynchronous mirror device including an asynchronous copy of data from the primary storage device, wherein said asynchronous mirror device is write disabled with respect to received write requests requesting to write data thereto, said asynchronous mirror device used for servicing data requested in connection with read requests upon the occurrence of a cache miss. If the I/O request is a read request, read request processing may be performed. The read request processing may include: determining whether read request data of the read request is in cache; if a current copy of said read request data is not in cache, determining whether the current copy of the read request data is stored in the asynchronous mirror device; if the current copy of the read request data is stored in the asynchronous mirror device, retrieving the current copy from the asynchronous mirror device to service the read request, and otherwise, if the current copy of the read request data is not stored in the asynchronous mirror device, retrieving the current copy from the primary storage device. The primary storage device may be a disk device and the asynchronous mirror device may be a flash device comprising flash memory using a flash memory technology. An amount of time to read data from the primary storage device may be greater than another amount of time to read data from the asynchronous mirror device. The copying may be performed using a background copy operation, and after destaging the write request data from cache to the primary storage device, a bit map may be updated to indicate that a current copy of the write request data is stored in the primary storage device and not in the asynchronous mirror device, and after said copying copies the write request data to the asynchronous mirror device, the bit map may be updated to indicate that the current copy of the write request data is stored in the primary storage device and the asynchronous mirror device. The bit map may include an entry for each partition of data of the primary storage device, and the background copy operation may copy data to the asynchronous mirror device in chunks each having a size of a block, a size of said block being determined in accordance with internal processing performed on the asynchronous mirror device for garbage collection processing and wear leveling, said size being a multiple number of partitions of the primary storage device. The heuristic may indicate, for each block, a threshold number of entries in the bit map so that each of said threshold number of entries has to have a predefined value for copying of said each block to the asynchronous mirror device to be performed, and wherein each block may correspond to a predetermined set of one or more partitions of the primary storage device so that said one or more partitions are always written in a same block. The data storage system may include a plurality of primary storage devices, one or more of the primary storage devices each being selectively bound to a corresponding asynchronous mirror device. A first portion of the primary storage devices may be bound to corresponding asynchronous mirror devices and a second portion of the primary storage devices different than the first portion which may not be bound to corresponding asynchronous mirror devices, each primary storage device in said first portion providing data to an application having a higher quality of service level than another application having data stored on one of the primary storage devices included in the second portion. Specifying a binding of a primary storage device to a corresponding asynchronous mirror device may be configurable. The binding may be specified using metadata for a bit map associated with the binding. The bit map may be updated after said destaging and after said copying to indicate whether a current copy of data portions of the primary storage device are stored on the corresponding asynchronous mirror device as well as the primary storage device. The bit map may be used in connection with processing an I/O request that is a read request for the primary storage device to determine whether a current copy of read request data of the read request is stored in the corresponding asynchronous mirror device, and if the current copy is stored in the corresponding asynchronous mirror device, the current copy may be retrieved from the corresponding asynchronous mirror device to service the read request, and otherwise, if the current copy of the read request data is not stored in the corresponding asynchronous mirror device, the current copy may be retrieved from the primary storage device. The plurality of primary storage devices may be each selectively bound to one of a plurality of flash memory devices, said flash memory devices may include at least one device that is a multi-level cell flash memory device and at least one device that is a single level cell flash memory device.

In accordance with another aspect of the invention is a data storage system comprising: a memory; a cache; a plurality of primary storage devices, said plurality of primary storage devices including disk devices; a plurality of asynchronous mirror devices, said plurality of asynchronous mirror devices including flash memory devices, wherein at least one of the plurality of primary storage devices is bound to one of said plurality of asynchronous mirror devices; bit map metadata stored in the memory and indicating that each of said at least one of the plurality of primary storage devices is bound to one of said plurality of asynchronous mirror devices; a bit map stored in the memory and associated with each binding represented in the bit map metadata, said each binding representing a binding of a first primary storage device to a first asynchronous mirror device, said bit map including bit map entries corresponding to portions of said first primary storage device, each of said bit map entries indicating whether a current copy of a corresponding portion of data of the first primary storage device is included in both the first primary storage device and the first asynchronous mirror device, or whether the current copy is included in the first primary storage device and not the first asynchronous mirror device; and a computer readable medium comprising executable code store thereon for processing a write request to write data to the first primary storage device, the executable code for processing a write request including code for: copying write request data of the write request to the cache; destaging the write request data to the first primary storage device; and copying, in accordance with a heuristic, the write request data from the first primary storage device to the first asynchronous mirror device including an asynchronous copy of data from the first primary storage device, wherein said first asynchronous mirror device is write disabled with respect to received write requests requesting to write data thereto, said first asynchronous mirror device used for servicing data requested in connection with read requests upon the occurrence of a cache miss. The computer readable medium may include executable code stored thereon for processing a read request, said executable code for processing a read request may include executable code for: determining whether read request data of the read request is in cache; if said read request data is not in cache, determining whether the read request data is stored in one of said plurality of asynchronous mirror devices; and if the read request data is stored in one of the plurality of asynchronous mirror devices, retrieving data therefrom to service the read request, and otherwise, if the read request data is not stored in one of the plurality of asynchronous mirror devices, retrieving data from one of the plurality of primary storage devices including said read request data. The executable code for copying may be performed in connection with a background copy operation, and after said destaging, said bit map associated with said each binding may be updated to indicate that a current copy of the write request data is stored in the first primary storage device and not in the first asynchronous mirror device, and after said copying copies the write request data to the first asynchronous mirror device, the bit map may be updated to indicate that the current copy of the write request data is stored in the first primary storage device and the first asynchronous mirror device. Wherein said determining whether the read request data is stored in one of said plurality of asynchronous mirror devices may use one or more bit maps, each bit map corresponding to one binding included in said bit map metadata indicating that one of the plurality of primary storage devices is bound to one of the asynchronous mirror devices. Copying data from the first primary storage device to the first asynchronous mirror device may copy data in blocks having a size determined in accordance with wear leveling and garbage collection processing performed internally on said first asynchronous mirror device. The heuristic used in connection with said copying data may indicate a threshold amount of said block having a current copy which is stored in said first primary storage device and not in said first asynchronous mirror device.

In accordance with another aspect of the invention is a computer readable medium comprising executable code stored thereon for processing an I/O request in a data storage system, the computer readable medium comprising executable code for: receiving the I/O request; determining whether the I/O request is a write request; and if the I/O request is a write request, performing write request processing including: copying write request data of the write request to cache;

destaging the write request data from the cache to a primary storage device; and copying, in accordance with a heuristic, the write request data from the primary storage device to an asynchronous mirror device including an asynchronous copy of data from the primary storage device, wherein said asynchronous mirror device is write disabled with respect to received write requests requesting to write data thereto, said asynchronous mirror device used for servicing data requested in connection with read requests upon the occurrence of a cache miss.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
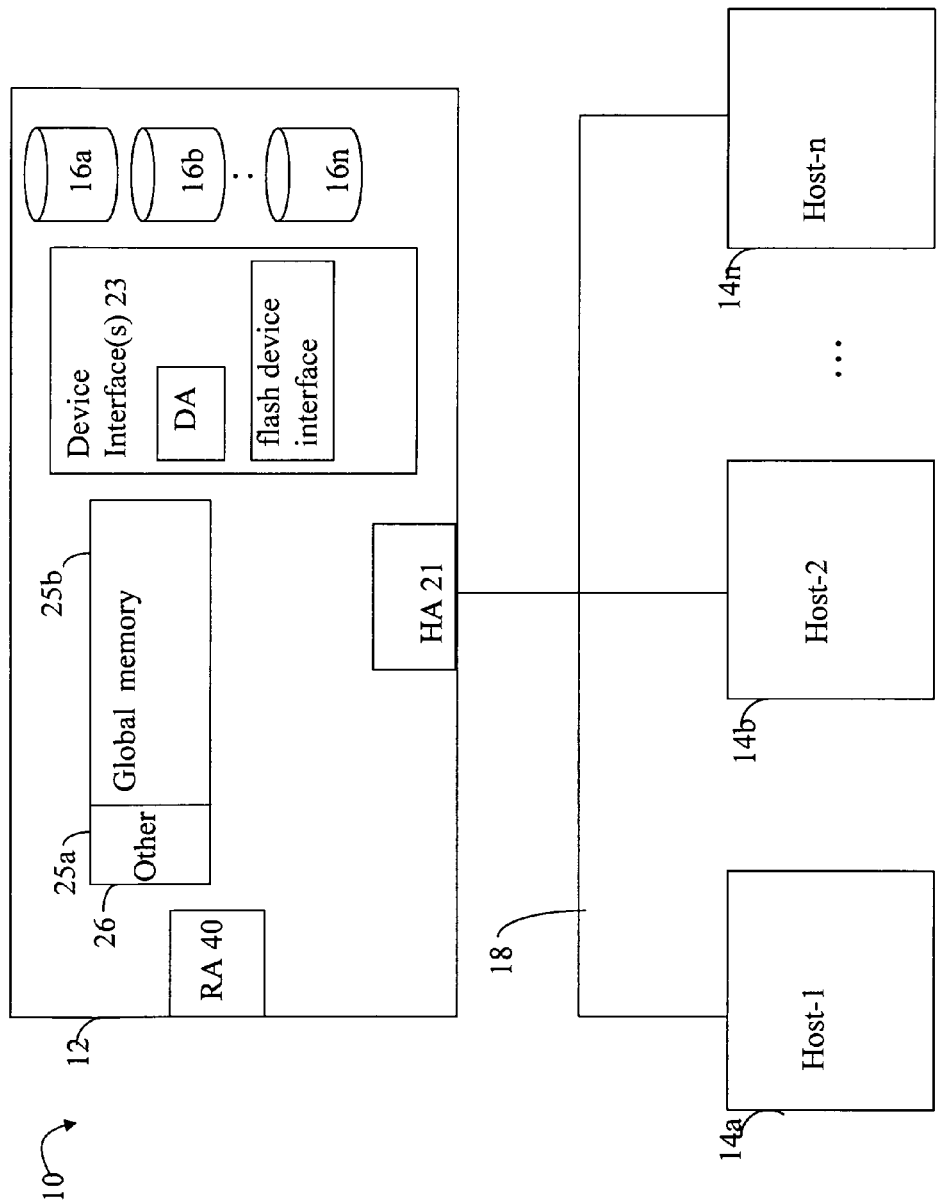
FIG. 1 is an example of an embodiment of a computer system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Figure 2:
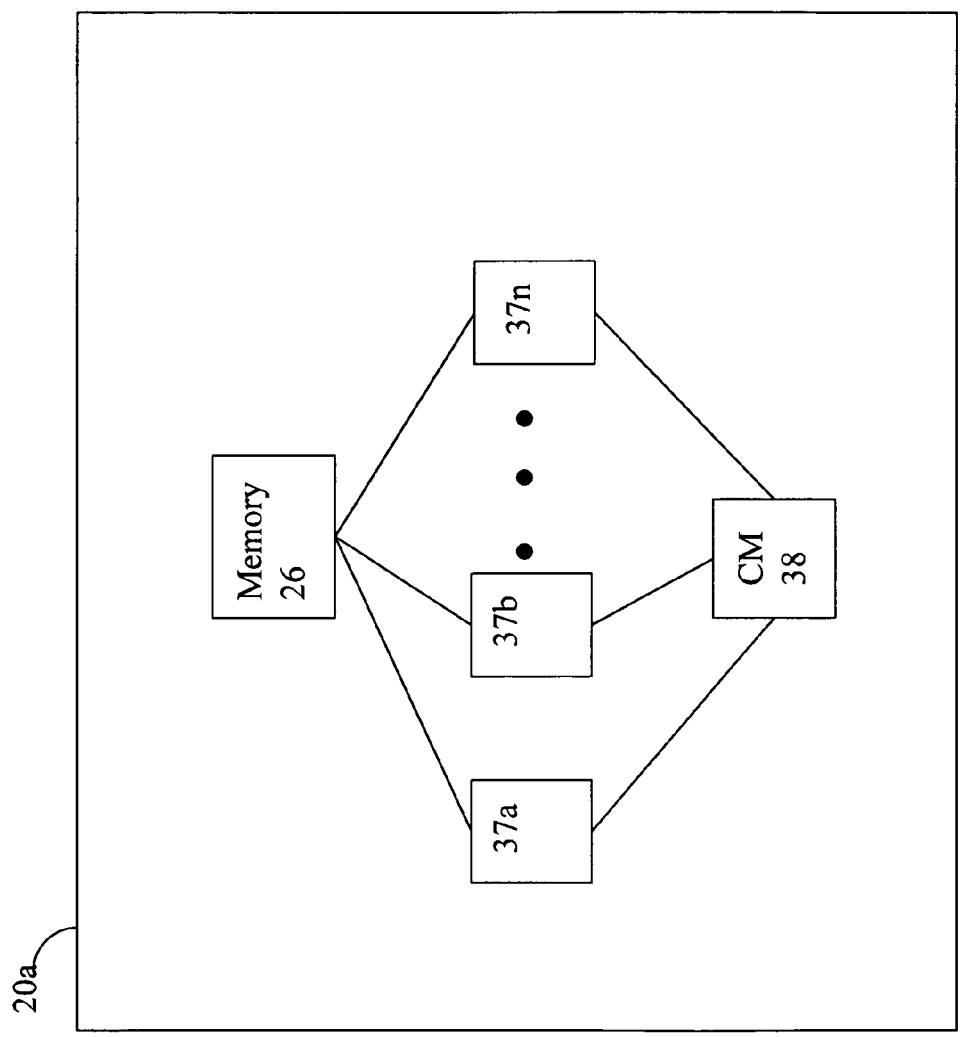
FIG. 2 is a representation of the logical internal communications between the directors and memory included in one embodiment of data storage system of FIG. 1.

Referring to FIG. 2, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host. In connection with a write operation, an embodiment may first store the data in cache included in a portion of GM 25b, mark the cache slot including the write operation data as write pending (WP), and then later destage the WP data from cache to one of the devices 16a-16n.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array by EMC Corporation of Hopkinton, Mass. In the foregoing data storage array, the data storage devices 16a-16n may include a combination of disk devices and flash devices in which the flash devices may appear as standard Fibre Channel drives to the various software tools used in connection with the data storage array. The flash devices may be optimized for write longevity using a variety of different techniques known in the art, such as wear leveling. Wear leveling may be characterized as a technique that attempts to arrange or store data on the flash drive where erasures and rewrites are evenly distributed so that no single cell prematurely fails due to a high concentration of writes. Additionally, a data storage array may utilize some techniques in connection with flash devices, other SSDs, and also disks. For example, bad blocks, or other portions of a drive may be mapped out so that once discovered, they are not subsequently used for storing data. Techniques such as wear leveling and mapping out bad blocks or other bad data portions may be used in combination with the techniques described herein in following paragraphs for flash devices. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles. It should be noted that terms write and program may be used interchangeably herein in connection with describing writing or programming cells of the flash drive to store data values.

The techniques herein may be generally used in connection with any type of flash device technology. The flash device may be, for example, a flash device which is a NAND gate flash device, NOR gate flash device, flash device that uses SLC or MLC technology, and the like, as known in the art. As known in the art, MLC, in contrast to SLC, stores more than 1 bit per cell. More generally, the techniques herein may be used in connection with other technologies although particular flash memory technologies may be described herein for purposes of illustration.

The techniques herein may be performed in an embodiment in addition to other techniques, such as ECC and wear leveling as may be used with flash devices, which may vary with the particular type of device. As known in the art, writing to a flash device, for example, such as one using SLC technology, includes performing a first operation to erase any existing data and then a second operation to write or program the new data to be stored. Although description herein may be made to performing a write operation to the flash device for purposes of simplification in description, it will be appreciated that performing write operations to flash devices as described herein implies performing both the necessary erasure operation and write operation for writing data to the flash device. Additionally, in connection with the foregoing for examples described herein regarding flash devices, wear out or usage may be expressed as being dependent on a number of write operations performed although the wear out or usage is actually caused by (e.g., dependent upon) performing the implied erasure operation in order to effect the subsequent write operation to record or write new data to the flash device. Thus, description herein for flash devices referring to wear out or usage based on a number of write operations implies the wear out or usage in accordance with the implied erasure operation necessary to effect the subsequent writing of the new data.

In accordance with techniques described in following paragraphs in one embodiment, an original data set may be maintained on disk devices comprising primary storage and, additionally, one or more flash devices may be used to store an additional copy of selected portions of data from the one or more disk devices. In one aspect, the additional copy of data on the one or more flash devices as used in an embodiment with the techniques herein may be characterized as an asynchronous mirror with respect to data stored on the one or more disk devices.

What will be described in following paragraphs are techniques for use with one or more devices of the data storage system 12 serving as asynchronous mirrors of other devices included in the data storage system. In one exemplary embodiment as will be described herein, the data storage system 12 may include one or more disk devices and one or more flash devices. The one or more disk devices may be used as primary non-volatile storage devices. A disk device may be selectively bound to a corresponding flash device in which the corresponding flash device functions as an asynchronous mirror with respect to the disk device. The asynchronous mirror may contain an asynchronous copy of an original data set on a disk device to which the asynchronous mirror is bound. The copy of the data set stored on the asynchronous mirror is not synchronized and may not be identical to the original data set as included on the disk device to which the asynchronous mirror is bound. Thus, the asynchronous mirror may not contain an up-to-date or identical version of all data portions included in the original data set. In one embodiment, the one or more flash devices used as asynchronous mirror devices may include MLC flash memory devices although an embodiment may utilize MLC, alone or in combination with, other types of flash memory devices or other suitable memory and data storage technologies.

In following paragraphs, data flows with respect to read and write requests as may be issued by a host and received at a data storage system are described to illustrate use of the techniques herein.

Figure 3:
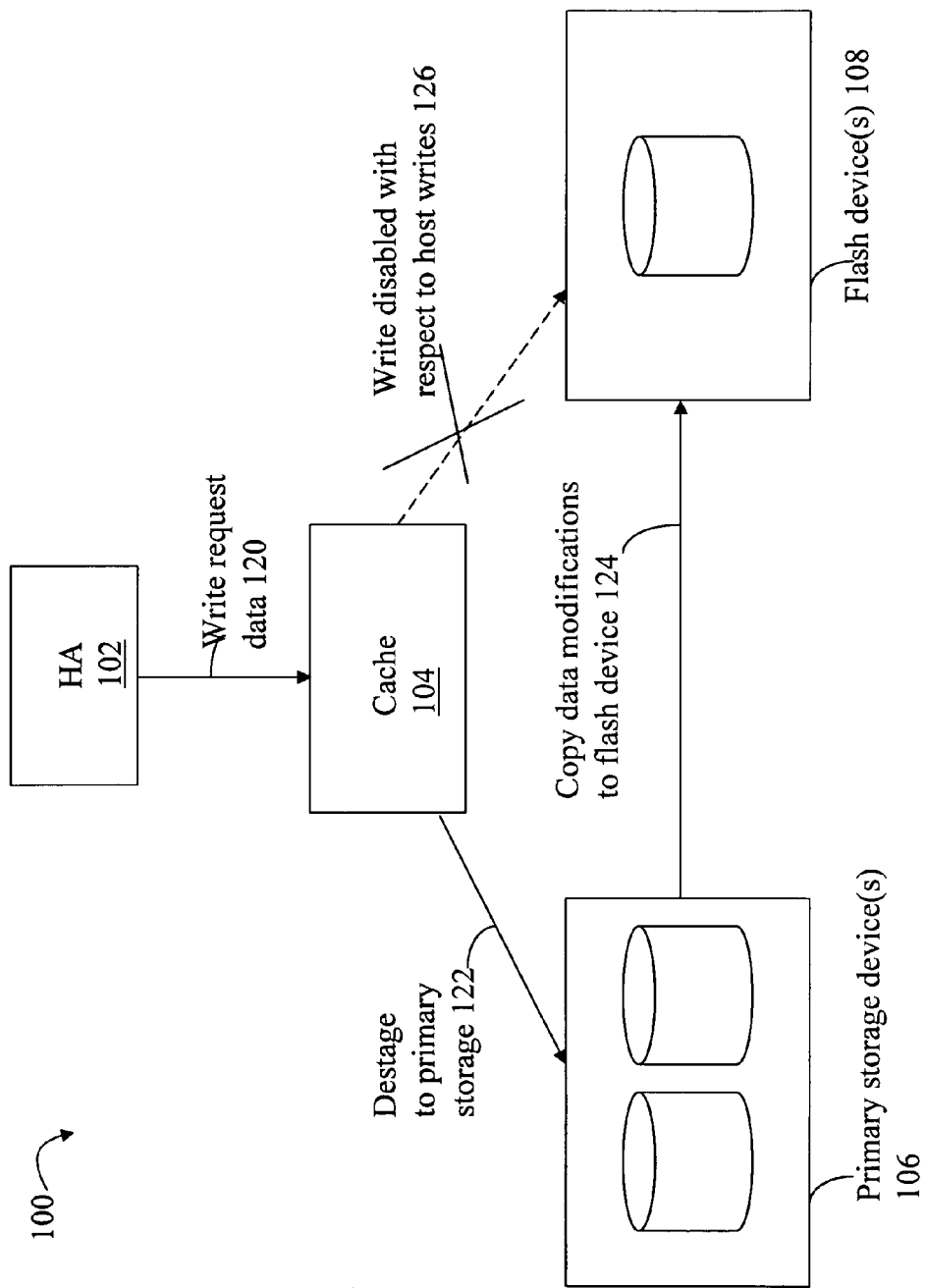
FIG. 3 is an example representing data flow processing of a write request received at a data storage system in accordance with techniques herein.

Referring to FIG. 3, shown is an example representation of write data flow in an embodiment using the techniques herein. The example 100 illustrates data flow regarding a write request as may be issued by a host to the data storage system in accordance with an embodiment using the techniques herein. The example 100 illustrates components of the data storage system including an HA 102, a cache 104, primary storage devices 106 and flash devices 108. In the example 100, the one or more flash devices 108 serve as an asynchronous mirror with respect to selected primary storage devices 106 for use in connection with the techniques herein.

The HA 102 may be characterized as a front end component of the data storage system which receives a request from the host. The HA 102 may receive the write request from the host and store the write request data 120 in the cache 104. The cache 104 may be a portion of memory which is accessible for use by different components of the data storage system such as, for example, by the DA and HA in performing data operation processing. The cache 104 may be included in a portion of GM as described above. When the write data is stored in cache, the cache slot or other portion of cache including the write request data is marked as write pending (WP) and needs to be destaged or written out to the primary storage devices 106. In one embodiment, write request data may be written to cache first and then, at a later point in time, the write request data is destaged 122 to primary storage devices 106. Data in the cache marked as WP means that the cache contains the most up to date copy of the data and such copy of the data has not yet been destaged. After data from cache is destaged, the data is no longer considered "write pending" and the WP indicator associated with the cache slot containing the data may be accordingly updated. The DA may perform processing to destage the data from cache to the primary storage devices 106. Primary storage devices 106 may include one or more disk devices. The WP indicator may serve as an indicator to the DAs regarding what cached data to destage to the primary storage devices 106. The primary storage devices 106 may be, for example, disk devices forming one or more RAID groups of any protection level such as, for example, RAID-1, RAID-5 or RAID-6.

In connection with the techniques herein, a bit map may be maintained to indicate whether data stored on a primary storage device is also included in an asynchronous mirror. When data is destaged to the primary storage devices 106, the DA may update the bit map to indicate that the latest version of the data is included in a primary storage device but not on an asynchronous mirror device. At various points in time, a copy process may execute to copy portions of the primary storage devices to the one or more flash devices 108 (serving as the asynchronous mirror of primary storage) and accordingly update the bit map. The copy process may execute as a background copy operation, for example, when the DA is idle.

In one embodiment as just described, the DA may handle processing associated with destaging cached data and managing the bit map. Additionally, code of the background copy operation may be included in the DA to perform copying of data from primary storage devices to the flash devices and accordingly update the bit map. The bit map is described in more detail in following paragraphs and figures and indicates whether a copy of data stored in the primary storage is also in the asynchronous mirror. The background copy processing is also described in more detail in following paragraphs.

It should be noted that the devices used in providing the asynchronous mirror of the primary storage devices are write disabled with respect to host writes. In other words, the host cannot directly address and access the flash device or other devices, which are used as asynchronous mirror devices, for writing. The background copy operation may write to the asynchronous mirror when copying data from primary storage as illustrated by 124. As will be described in following paragraphs, although the flash devices serving as the asynchronous mirror may not be directly written to or directly accessed by the host, the copy of data in the flash devices serving as the asynchronous mirror may be read in connection with supplying data for host requests. It should be noted that the term asynchronous mirror may be used herein to refer generally to the copy of data from primary storage stored in the one or more flash devices 108. Additionally, the term asynchronous mirror volume or asynchronous mirror device may also be used herein to refer, respectively, to flash volumes or devices used to provide the asynchronous mirroring of data from the primary storage for use with the techniques herein.

As described above, one or more primary storage devices, such as disk devices or portions thereof, may be selectively bound to corresponding asynchronous mirror devices so that an asynchronous mirror may not be used in connection with each primary storage device. In other words, there may be some first portion of the disk devices which are bound to corresponding asynchronous mirror devices and some other second portion of disk devices which are not bound to corresponding asynchronous mirror devices. For those primary storage devices, or portions thereof, having a corresponding asynchronous mirror, the techniques herein may be utilized.

The portion of the primary storage that may be bound to an asynchronous mirror may vary with embodiment. For example, an embodiment may allow a logical device, physical device, portion of one or more logical and/or physical devices, or other logical and/or physical entity to be bound to an asynchronous mirror. The level of granularity that may be used in connection with defining and utilizing an asynchronous mirror, such as the flash device(s) 108, with techniques herein may vary.

For purposes of illustration of the techniques herein, processing may be performed with respect to a track of data. Host operations may be performed with respect to tracks of data, or portions of a track, data may be cached in a cache slot having a granularity which is the size of a data track, and the like. A track of data may correspond to 64 KB of data although an embodiment may use tracks or other data granularity sizes.

Figure 4:
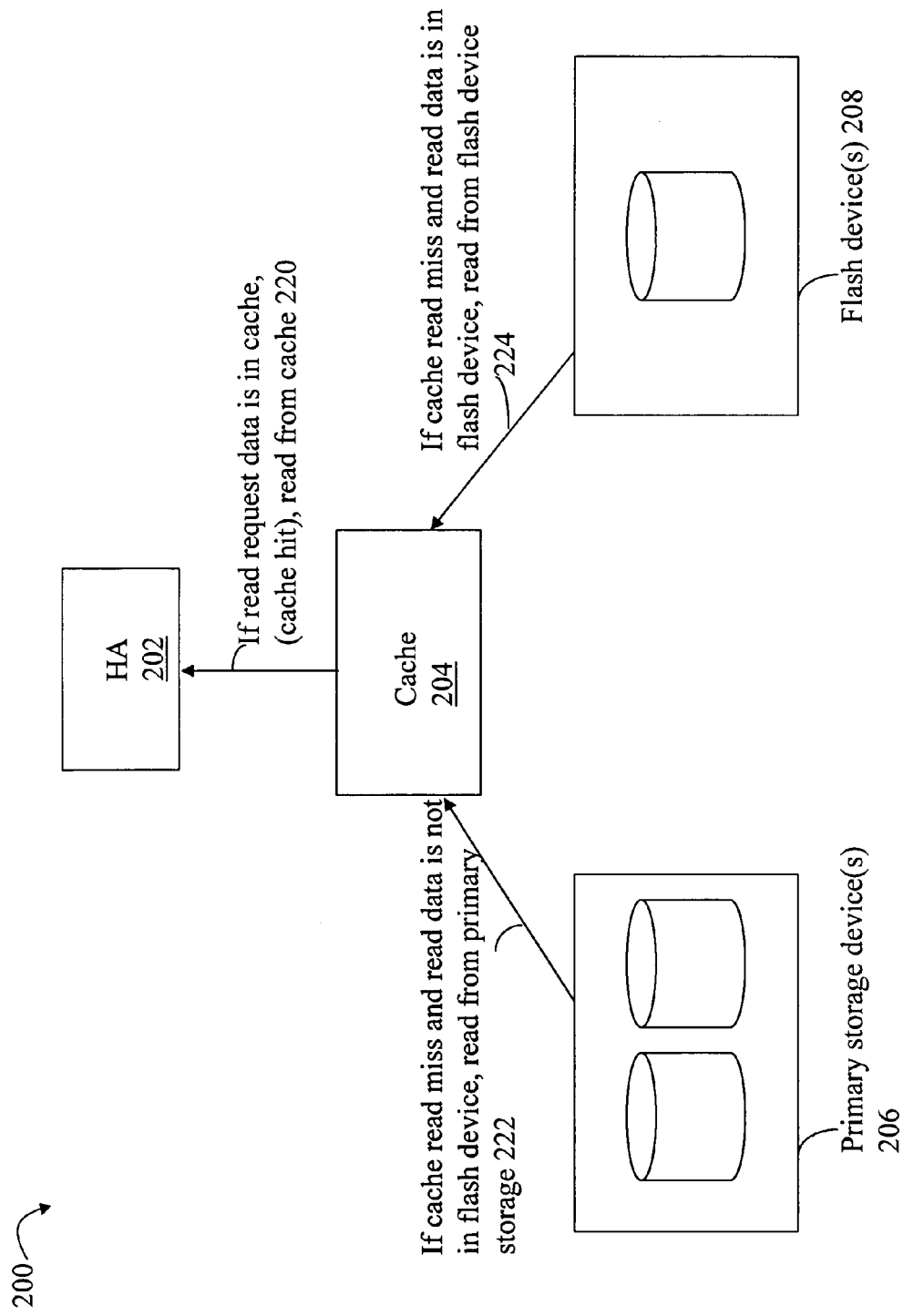
FIG. 4 is an example representing data flow processing of a read request received at a data storage system in accordance with techniques herein.

Referring to FIG. 4, shown is an example representation of read data flow in an embodiment using the techniques herein. The example 200 illustrates data flow regarding a read request as may be issued by a host to the data storage system in accordance with an embodiment using the techniques herein. The example 200 illustrates components of the data storage system including an HA 202, a cache 204, primary storage devices 206 and flash devices 208 which are analogous to those as described above in connection with FIG. 3.

When the HA 202 receives a read request from a host, it is determined whether the requested read data is in cache. If so, there is a cache hit and the data is retrieved from cache as illustrated by 220 and returned to the host. If the requested data for the read operation is not in cache, there is a cache miss and a determination is made as to whether the requested data is stored in a flash device serving as an asynchronous mirror. If so, the data is read from the asynchronous mirror as illustrated by 224, stored in the cache, and then returned to the host. If the requested read data is in the asynchronous mirror as just described, there is a read miss to the flash device with a read response time that is less than the response time needed to retrieve the data from a disk device as included in the primary storage devices 206.

If the requested data for the read operation is not in cache and is also not stored in a flash device serving as an asynchronous mirror, the data is retrieved (as illustrated by 222) from a disk device included in the primary storage devices 206. If the requested read data is not in the asynchronous mirror as just described, there is a read miss to the disk devices included in the primary storage devices 206 with a read response time in accordance with the time needed to retrieve the data from a disk device. The read response time needed to retrieve data from a disk device is greater than the read response time needed to retrieve data from a flash device serving as an asynchronous mirror for data included in the primary storage devices 206.

Thus, an embodiment in accordance with the techniques herein may utilize an asynchronous mirror with a technology, such as a flash memory technology, that provides faster data retrieval than when data is retrieved from a primary storage device such as a disk device. As described, an embodiment may use the asynchronous mirror for servicing read requests. The data in the asynchronous mirror may always be first stored to primary storage, such as disk devices, and then later copied to the asynchronous mirror. By providing the asynchronous mirror, read performance may be increased and thus overall I/O performance may be increased.

In the example 200, the bit map as mentioned in connection with FIG. 3 which is maintained by the DA may be read in determining whether requested data is stored in the asynchronous mirror.

Figure 5A:
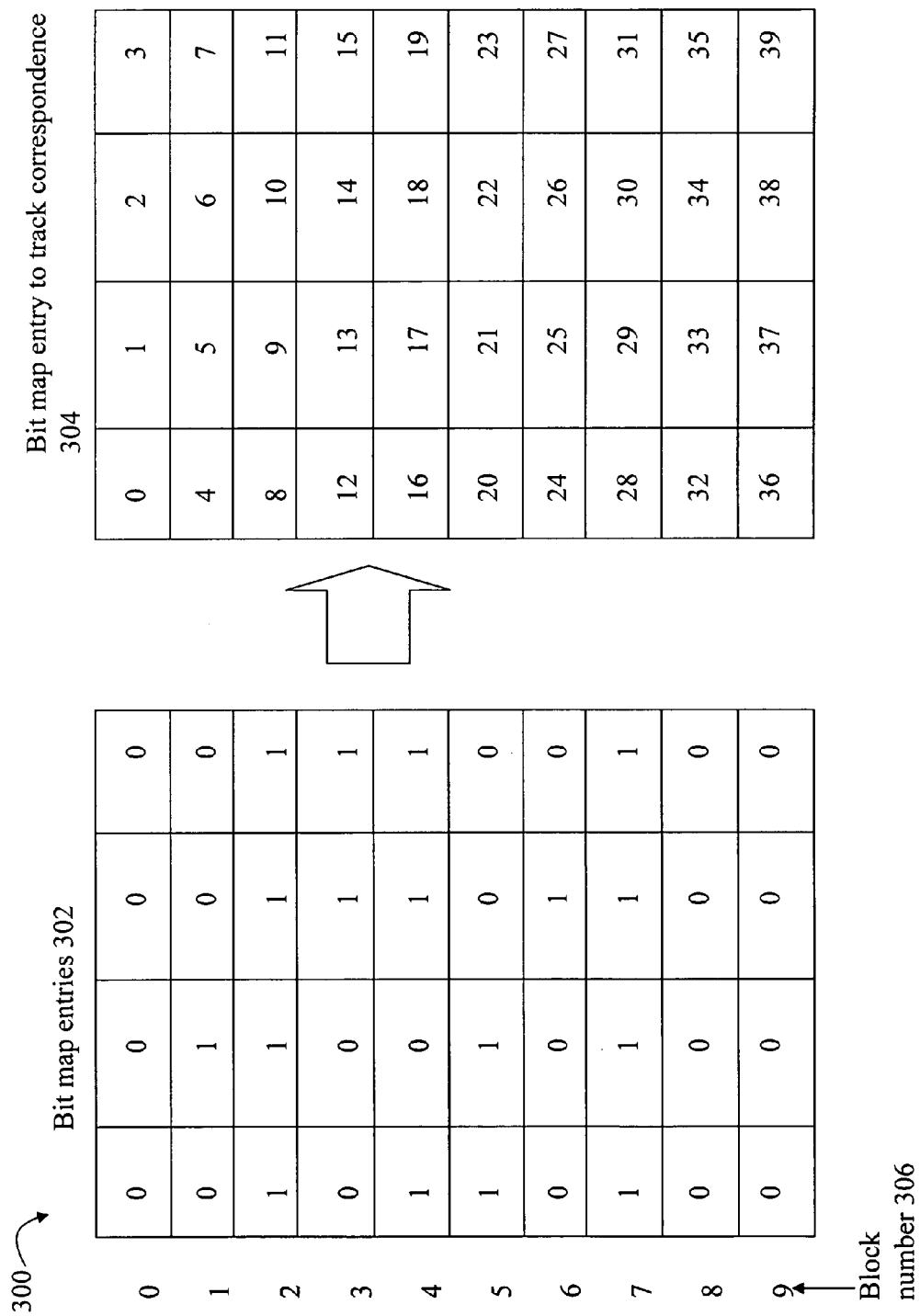
FIG. 5A is an example representation of a bit map and corresponding tracks that may be used in connection with an embodiment in accordance with the techniques herein.

Referring to FIG. 5A, shown is an example illustrating the bit map that may be used in and embodiment in connection with the techniques herein. Element 302 is a representation of a bit map which contains one entry for each track. A bit map may be maintained for each portion of primary storage which has a corresponding copy of data included in the asynchronous mirror. The bit map may be stored in a portion of GM or other location which is accessible to those data storage system components utilizing the bit map to perform processing in accordance with the techniques herein. A bit map may be maintained for each primary storage device which is bound to an asynchronous mirror device. Element 304 represents which track logically corresponds to which entry in the bit map 302. In this example, there are 40 tracks enumerated with a zero-base and the bit map entries logically correspond to tracks on a row by row basis with 4 bits per row of the bit map. It will be appreciated by those skilled in the art that an embodiment may use variations from that described in the example 300. For example, each bit map entry may correspond to a data portion other than a track, a device may have a different number of tracks other than 40, and the like.

Each row in the bit map 302 consists of 4 bit map entries and corresponds to a block number as indicated by block number 306. As will be described in more detail in following paragraphs, the background copy process may copy data from primary storage to the flash device serving as the asynchronous mirror in chunks which each have a size of a block. A "block" may be defined as the smallest addressable unit for performing erase operations to a flash device. A block may consist of multiple pages where a "page" refers to the smallest addressable unit for read and program (or write) operations in connection with a flash device. Blocks and pages as may be used in connection with the techniques herein are described in more detail in following paragraphs. In this example, a block may have a size of 256 KB corresponding to 4 tracks, where each track is 64 KB. Each page may have a size equal to one track or 64 KB. The block may have a size which is equal to the size used in connection with garbage collection and wear leveling techniques that may be performed by code executing on the flash devices. In connection with one embodiment, the flash device may be programmed to program or write data in accordance with a minimum size, also referred to as a "page", which is less than the size of a block. However, an embodiment of the background copy processing may write to the flash device used as the asynchronous mirror in chunks which are of the block size in order to avoid performing additional erasure operations, known as write amplification, that may be introduced when performing garbage collection processing for different wear leveling techniques.

The background copy process may copy data from primary storage to the flash devices or other devices used to provide the asynchronous mirror in accordance with a defined policy. The policy may leverage characteristics related to the storage technology of the devices used as the asynchronous mirror devices. For example, as just described, the background copy process may write data to the flash device in chunks of a selected size in a sequential logical address pattern such as the foregoing block size, for example, in order to eliminate write amplification and, thus, reduce wear out and increase the amount of time the flash device is expected to be useable prior to failure. For example, in an embodiment in which the asynchronous mirror devices are MLC flash devices, the background copy process may perform processing in accordance with MLC characteristics.

As will be described in more detail in following paragraphs, tracking and writing blocks in accordance with a sequential logical address pattern is one way in which holes or invalid data portions within a block may be avoided in order to eliminate write amplification. As described below, the existence of "holes" one or more invalid data portions in combination with one or more valid data portions in a physical block causes write amplification. More generally, write amplification can be avoided by programming or writing blocks of data which do not result in both valid and invalid data portions in a single block. Tracking and programming blocks of the flash device based on blocks having a same set of sequential logical addresses is only one such technique that can be used to eliminate creation of holes and thus also eliminate resulting write amplification.

With reference back to FIG. 3, when a track of data is destaged from cache to primary storage, the bit map entry in 302 for the track may be updated to 1 to indicate that the data for the track is in primary storage but not in the asynchronous mirror. A value of 1 in a bit map entry may indicate that the corresponding track needs to be copied to the asynchronous mirror and the current copy of the track is stored in primary storage but not in the asynchronous mirror. Such processing of setting the bit map entry to 1 may be performed by the DA as described above. When the data is copied from the primary storage to the asynchronous mirror, such as part of background copy processing, the bit map entry for the track copied may be updated to 0 to indicate that the current copy of the data track is in the primary storage and also in the asynchronous mirror. A value of 0 in a bit map entry may indicate that the corresponding track does not need to be copied to the asynchronous mirror since the latest copy or current copy of the data is in the asynchronous mirror. In one embodiment, the background copy processing may copy (e.g., write) a block of data from primary storage to the flash device serving as an asynchronous mirror device in accordance with a heuristic. An embodiment may have the background copy processing write a block of data from a primary storage device to its corresponding flash device serving as the asynchronous mirror device when all bit map entries for that block are set to 1. The heuristic may indicate the foregoing number of bit map entries associated with each block that should be 1 in order to trigger the background copy processing to copy data of the block to the asynchronous mirror device. For example, the background copy processing may continuously and sequentially examine bit maps for those primary storage devices which are bound to asynchronous mirror devices and copy those blocks to the asynchronous mirror having all bit map entries for the block=1. As an example, block 2 and 7 may be copied since all bit map entries for these blocks are 1. After a block of data is copied, the background copy processing may accordingly update the bit map entries for the block to be 0 indicating that the current copy of the data is in the flash device serving as the asynchronous mirror device.

The heuristic used by the background copy processing as a trigger or threshold condition to determine when to copy data to the flash device serving as an asynchronous mirror may be configurable. As described above, the heuristic may be configured to require all bit map entries for the block to be set to 1 prior to copying the block of data from primary storage to the flash device. An embodiment may also tune or adjust the heuristic in accordance with a desired level of aggressiveness to increase read response time at an added cost of incurring the additional flash device wear. More generally, an embodiment may write a block to the flash device serving as an asynchronous mirror when "n"/"m" of the bit map entries for that block are set to 1, where "n" may be characterized as a threshold number of 1's for the block, and there are "m" bit map entries per block. If n<m, then tracks of data in the block may be rewritten which contain old data which has not been updated. For those tracks which contain old data which is rewritten (e.g., indicated by a 0 in the bit map), a read modify write may be performed in that the track of data is first read from the flash device or primary storage and then rewritten to the flash device along with the other data tracks in the block. For example, if the heuristic is set to ¾, then a block of data is written to the flash device when 3 or 4 bit map entries for the block are set to 1. In such a case with reference to FIG. 5A, block 4 in addition to blocks 2 and 7 may be copied. When writing block 4, data for tracks 16, 18 and 19 (e.g., having bit map entries=1) may be copied from primary storage into a buffer. Additionally, data corresponding to track 17 (e.g., having bit map entry=0) may be read from the flash device or primary storage into the buffer. The data for the block from the buffer may then be written as a single transaction to the flash device serving as an asynchronous mirror.

With reference back to FIG. 4 in connection with servicing a read request, the bit map 302 may be used when a cache read miss has occurred to determine whether a current copy of the requested data is stored on a flash device used as an asynchronous mirror. As described, a value of 0 for a bit map entry in the bit map may indicate that the current copy of the track of data is stored in the flash device as well as primary storage. A value of 1 for a bit map entry may indicate that the current copy of the track of data is stored in the primary storage but the current copy is not stored on the flash device.

In connection with the techniques herein, the bit map may be used to determine when to write to the flash device and also as an indicator as to whether a current copy of data is stored in the flash device serving as an asynchronous mirror device when supplying requested data in connection with a read operation.

In connection with a flash device, the flash device may be programmed to record or write new data in accordance with a first minimum size, such as 512 bytes, 2048 bytes, and the like, as may vary with the particular device. While programming of a flash device to record new data may be performed for a data portion of the first size, erasure of data on the flash device may be performed in accordance with a second size larger than the first size. The foregoing first size may be characterized as a more general term for the size of a page as also described herein. The foregoing second size may be characterized as a more general term for the size of a block as also described herein. Erasure of a cell is required prior to reprogramming or writing new data to the cell and erasure operations may be performed in blocks of the second size. The second size may be, for example, 128 KB, 256 KB, and the like, as may vary with the flash device. Thus, erasure operations of the flash device may be performed for each unit of data of the second size. Different techniques that may be utilized internally by the flash device, such as in connection with wear leveling and garbage collection, may take into account this second size and perform processing in accordance with this second size. In an illustrative example as described herein, for example, with reference to FIG. 5A, the first size (of a page) may be the size of a track, and the second size may be 256 KB and may correspond to the block size.

As described above such as in connection with wear leveling, data stored on a flash device may be associated by the flash device with a logical location that is mapped to a physical location on the flash device. It should be noted that this mapping from the logical to physical location on the flash device is internal to the flash device itself and may be performed in addition to other logical device virtualization or mapping utilized by the data storage system. Data stored at a logical flash device location may be updated or rewritten at various points in time and the flash device may internally store the different versions of the data for the single logical location at different physical locations on the flash device. Thus, if an update is performed and stored at a first physical location on the flash device, any previously stored versions at other physical locations are considered dirty resulting in "holes" or gaps within a valid data block of the flash device. The physical location containing the out of date or dirty copy of the data can be reused in subsequently storing data. At different points in time, code on the flash device may perform processing to erase the dirty physical locations through garbage collection and data consolidation processing which introduces additional erase cycles. Such additional erase cycles result in an effect called write amplification. The write amplification causes additional wear of the flash device. As such, techniques herein may be performed to eliminate the additional erase cycles or write amplification by writing to the flash device in blocks of the second size. For example, in one embodiment as described above, the second size (the block size) may be 256 KB and the garbage collection algorithm may examine a block of physically consecutive locations of flash memory in which the block is of the second size looking for invalid data or holes in the block of the second size. If one or more holes of invalid data are located in a first such block of the second size, the garbage collection algorithm may perform processing to copy the valid data portions of the first block to another physical flash memory location in a second block containing other valid data, and erase data in the first block. By writing data to the flash device in blocks equal to the second size in which each subsequent writing of a block includes the same logical addresses as when previously written, no holes of invalid data are created and the additional processing, erasing (e.g., write amplification) and copying incurred due to the holes are thereby eliminated. Thus, the background copy process may operate on and write data to the flash device in chunks of the second size corresponding to the size of the block that the garbage collection processing performed in connection with wear leveling operates upon. Different techniques can be used to track which logical addresses are written as a block so that the same logical addresses can be updated or subsequently programmed as a block. By writing the same set of logical addresses in a same block, all data portions of the block will be either valid or invalid and thus, no holes are created. That is, no block of data written will contain both valid and invalid data—all the data of each block as physically stored will be either valid or invalid.

Tracking and writing data in accordance with blocks formed from a sequential pattern, such as illustrated by the bitmap of FIG. 5A, is one such technique. It will be appreciated by those skilled in the art that, more generally, other techniques may also be used to ensure that no holes or invalid data portions are created in a block of data. More generally, a technique may be used to track which logical addresses or data portions are written together as a block at a first point in time. Subsequent writes may be performed of blocks in which a block includes the same logical addresses or data portions previously written together as a block.

By eliminating the additional erasure operations that may be performed in connection with garbage collection and wear leveling, the durability of the flash device is extended. In other words, the flash device may be characterized as having a longer expected lifetime in terms of calendar time and write operations for storing data by eliminating the additional writes performed as a result of internal processing performed by the flash device.

Figure 5B:
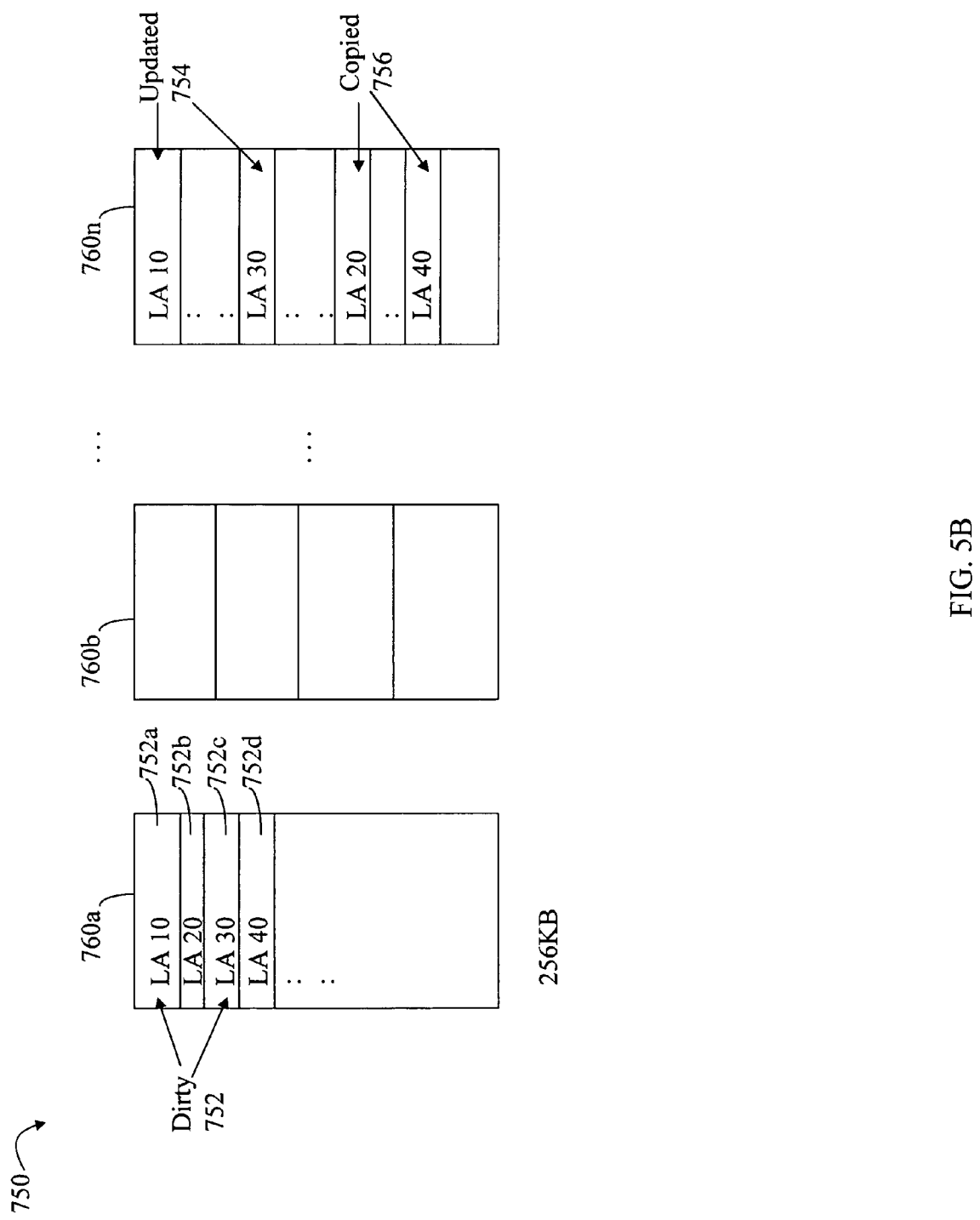
FIGS. 5B and 5C are examples illustrating processing that may be performed internally by a flash device in connection with garbage collection processing for a wear leveling technique.

To illustrate processing that may be performed in connection with garbage collection and data consolidation processing in an embodiment with a flash device, reference is made to FIG. 5B. The example 750 of FIG. 5B illustrates a representation of a physical view of storage on a flash device in which locations are shown in 256 KB blocks 760a-760n. In this example, the second size as described above may be 256 KB. Each element in a block, such as 752a, corresponds to one physical location at which data may be stored. Each element, such as 752a, may have a size corresponding to the first size above as the minimum size that can be programmed or written. The example 750 uses the notation LA n to refer to logical address n of the flash memory device whose contents is stored at the physical location. For example, element 752a refers to a physical location at which the contents of logical address 10 of the flash device is stored. At a first point in time, data may be written to logical addresses 10, 20, 30 and 40 and stored at physical locations on the flash device as respectively denoted by 752a-752d. At a second point in time, the contents of logical addresses 10 and 20 may be updated as denoted by 754 and the flash device stores the updated values at physical locations which are different from those containing the previous data contents for logical addresses 10 and 30. At this point, the contents of 752b and 752d have not been updated. Thus, the physical locations 752a and 752c are now dirty as denoted by 752 creating holes of invalid data in block 760a. Some time after the updated values of 754 are written, code stored on the flash device may be executed to perform garbage collection and data consolidation. In this example, the garbage collection processing may operate on chunks or blocks of the second size of 256 KB and may look for invalid data holes in each such block. If any invalid data hole is found in a first block, the remaining valid data in the first block may be copied to another data area and the portions in the first block are erased and made available for writing new data. Referring to FIG. 5B and performing garbage collection processing when examining block 760a, the contents of 752b and 752d may be copied to locations denoted by 756 and the physical locations of block 760a may then be erased.

By writing to the flash device in units of the second size in accordance with a sequential logical address pattern in which each time a same data block is written, the same logical addresses are updated, write amplification can be avoided since no invalid data holes are created. An entire block becomes dirty and the data portions therein may be erased for reuse. However, since no holes are created, additional processing and erasures made in connection therewith for consolidating valid data are not performed.

Figure 5C:
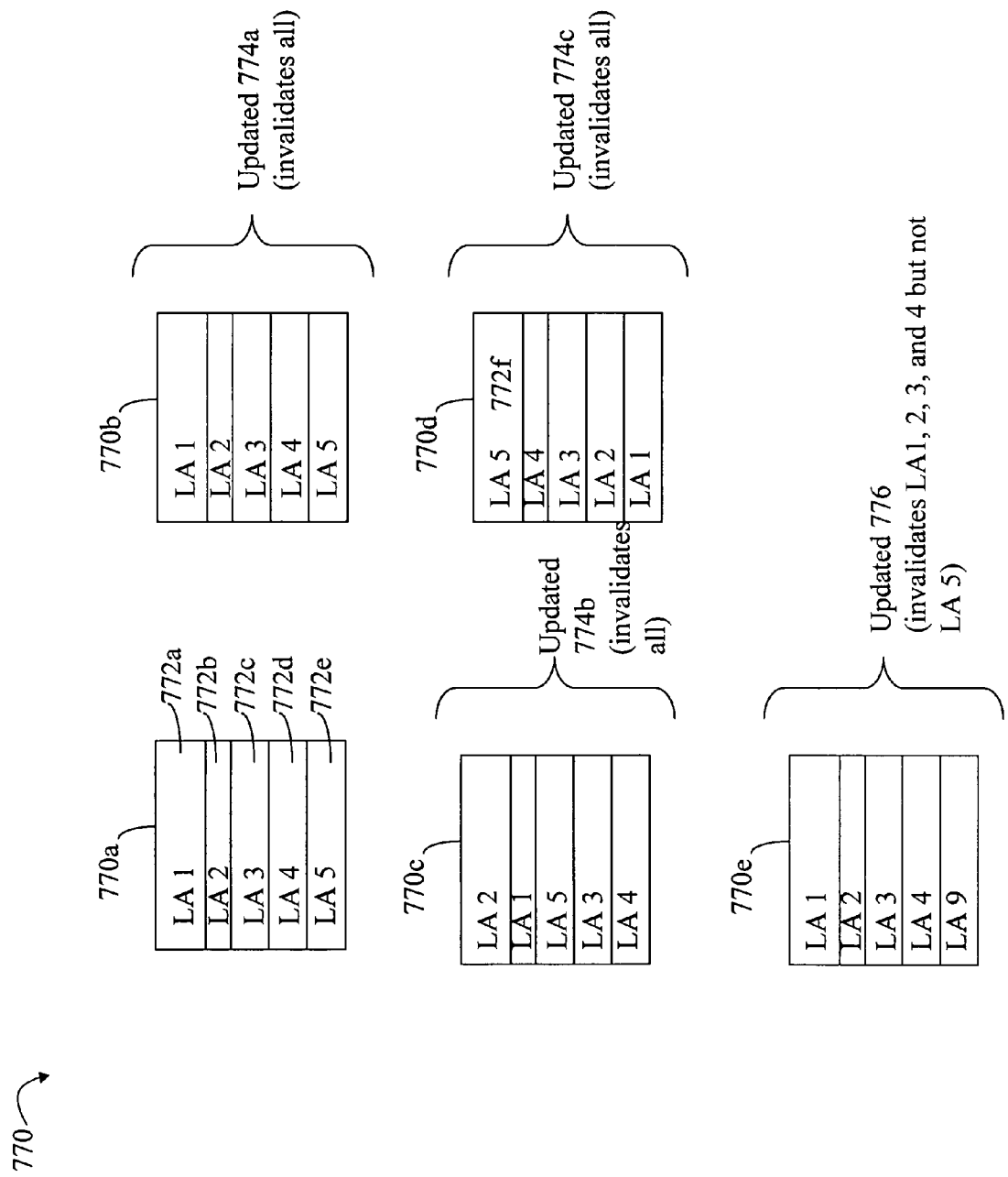

To further illustrate, reference is made to FIG. 5C. In the example 770 illustrating a physical storage view as in FIG. 5B, element 770a refers to a physical block of the flash device written at a point in time. In this example for simplification and illustration purposes, a block may consist of storage for holding data of 5 logical address (LA) locations. The background copy processing may track, such as using a bit map, which 5 LAs are written as a block at a first point in time resulting in storing data values in a physical block as illustrated by 770a. At a second later point in time, the contents for each of the same 5LAs may be updated by writing the 5LAs in the same block as illustrated by 770b. Element 770b represents a different physical block on the flash device to which the updated data values may be stored resulting in invalidation of all data included in 770a (e.g., all of 772a-772e are invalidated or dirty). If garbage collection is now performed, the physical storage 770a can be reused by erasing the contents of 772a-772e without first copying any valid data portions from 770a since no such valid data portions are included in 770a.

At a third later point in time, the contents for each of the same 5LAs may be updated by writing the 5LAs in the same block as illustrated by 770c. Element 770c represents a different physical block on the flash device to which the updated data values may be stored resulting in invalidation of all data included in 770b. In a manner similar to that as described above, if garbage collection is now performed, the physical storage 770b can be reused by erasing the contents therefrom without first copying any valid data portions from 770b. It should be noted that the LAs, or more generally, data portions, written as a block in 770c have a different ordering than as illustrated in 770b.

At a fourth later point in time, the contents for each of the same 5LAs may be updated by once again writing the 5LAs in the same block as illustrated by 770d. Element 770d represents a different physical block on the flash device to which the updated data values may be stored resulting in invalidation of all data included in 770c. In a manner similar to that as described above, if garbage collection is now performed, the physical storage 770c can be reused by erasing the contents therefrom without first copying any valid data portions from 770c. It should be noted that the LAs, or more generally, data portions, written as a block in 770d have a different ordering than as illustrated in 770b and 770c.

In contrast to writing the same data portions or data contents for a same set of logical addresses as a block each time, reference is made to element 770e. At a fifth later point in time, the contents for LA1, 2, 3, 4, and 9 may be written as a single block as illustrated by 770e. Element 770e represents a different physical block on the flash device to which the data values for the illustrated LA1, 2, 3, 4 and 9 may be stored resulting in invalidation of data portions of block 770d corresponding to LA1, 2, 3 and 4 but not LA5. Thus, LA5 (denoted by 772) contains valid data while the other locations of 770d contain invalid or dirty data. In a manner similar to that as described above, if garbage collection is now performed, the physical storage 770d can be reused after first copying any valid data portions from 770d (e.g., contents of location 772 is valid and copied to another location), and then erasing the contents of the block 770d of physical storage.

Element 770b illustrates tracking and writing a block of data in which the contents therein has a sequential ordering such as described elsewhere herein in connection with FIG. 5A. Sequentially tracking or mapping a set of sequential addresses which are written as a block is one technique. However, as illustrated in connection with 770c and 770d, the ordering of the addresses written as a block does not have to correspond to a sequential ordering or, more generally, any particular ordering as long as the same addresses are written as a block so that a physical block on the flash device contains either all invalid data or all valid data. In contrast, if a block 770e is written at a later point in time which contains data corresponding to different addresses than previously written as in block 770d, block 770d contains both valid and invalid data. Prior to reusing block 770d, valid data is copied therefrom to another physical location so that there is an added erasure operation incurred (e.g., write amplification) in connection with storing the valid data from 772f.

As another example of a mapping that may used in mapping logical addresses or locations associated with each block written to the flash device, an embodiment may map a set of logical addresses which are not consecutive. For example, with reference back to FIG. 5A, if a block has a size which corresponds to 10 tracks as may be represented by a column of 304, a first block written may be mapped to the first column of 304 (e.g., including tracks 0, 4, 8, 12, . . . , 36), a second block written may be mapped to the second column of 304 (e.g., including tracks 1, 5, 9, . . . 37), a third block written may be mapped to the third column of 304 (e.g., including tracks 2, 6, 10, . . . , 38), and a fourth block written may be mapped to the fourth column of 304 (e.g., including tracks 3, 7, 11, 15, . . . , 39). Additionally, so long as each write of a block includes data for the same addresses each time the block is written, the ordering of the data within the block when written can correspond to an ordering of the addresses associated with the block.

Use of the asynchronous mirror techniques as described herein provides advantages. Data is protected by the primary storage devices, such as disk devices or other magnetic storage devices. Thus, an embodiment may use more traditional techniques and storage technologies for data protection in connection with primary storage, such as disk devices and RAID groups, in addition to the asynchronous mirror devices which may utilize different storage technologies to provide increased read and I/O performance but may not be as durable or reliable as storage technologies used for the primary storage. An embodiment may implement an asynchronous mirror device using a storage technology, such as MLC flash memory, which provides lower read response times when data is read from the asynchronous mirror than when the data is read from primary storage. Even if the flash device used as the asynchronous mirror device wears out or fails, the original data in the primary storage devices is still available to provide non-disruptive data operation to the host. Write performance is not hindered since the flash devices that may be used as asynchronous mirror devices are used for servicing read requests.

An embodiment may selectively bind flash devices used as asynchronous mirror devices to different portions of primary storage. For example, an embodiment may selectively bind flash devices used as asynchronous mirror devices to one or more logical devices serving particular sets of application data. The selection can be based, for example, on quality of service (QOS) for those applications expecting higher QOS or service performance levels and lower I/O response times so that the primary storage volumes used by these applications are bound to an asynchronous mirror. An embodiment may also selectively bind asynchronous mirror devices to one or more portions of primary storage based on application lifetime and historical data collected for an application. For example, it may be observed by data collection that particular months, weeks, and the like, are ones in which an application experiences increased data requests. During these times, the storage devices used by the application may be bound to asynchronous mirror devices to provide increased performance in servicing requests. At times when data requests for the application are lower, an embodiment may select to not use asynchronous mirror devices for those primary storage devices including the application's data.

As described herein, the background copy processing may be performed in accordance with a defined policy. In an embodiment in which the asynchronous mirror devices are flash devices, the policy may include policy criteria which indicates a block size of the chunks of data copied to the flash device, affects the heuristic used in determining when to copy data to the flash device (e.g., indicates a threshold number of 1's in the bit map entries for a block), affects when code of the background copy processing is executed (e.g., only when the DA is idle), and the like. The block size may be configured in accordance with the size that may be utilized by the flash devices in connection with garbage collection and wear leveling techniques. The foregoing criteria affecting the heuristic and/or the times at which the background copy processing is performed may be configured in connection with a level of aggressiveness desired for the background copy operation and allocation of data storage system resources for use with background copying. By adjusting the one or more criteria affecting the aggressiveness of the background copy operation to be more aggressive, the chance of reading requested data included in the asynchronous mirror increases to thereby increase read performance and overall I/O performance.

It should be noted that an embodiment may select which one or more memory technologies to use for asynchronous mirror devices in accordance with one or more criteria such as, for example, cost, desired amount of time prior to device failure, device usage, and the like.

An embodiment may use techniques described in U.S. patent application Ser. No. 12/215,432, filed Jun. 27, 2008, Kendell A. CHILTON, et al., TECHNIQUES FOR OBTAINING A SPECIFIED LIFETIME FOR A DATA STORAGE DEVICE, EMC-08-105/EMS-223US, which is incorporated by reference herein, in connection with selecting a level of aggressiveness and adjusting the heuristic of the copy process to achieve a desired lifetime of the flash device. An embodiment may track the number of writes performed to the flash device over a specified time period to determine an actual write performance rate for the flash device. If the actual write performance rate exceeds a threshold write performance rate needed to achieve a desired amount of calendar or wall clock time for the life expectancy of the flash device, the heuristic used by the copy process may be adjusted accordingly. For example, in order for the flash device to last 2 years, it may be determined that the actual write performance rate to the flash device should not exceed a threshold write performance rate. If the actual performance rate observed does exceed this threshold, the heuristic can be adjusted to be less aggressive (e.g., write a block to the flash device only when 4/4 bits for the block are set). If the actual write performance rate is less than the threshold, the aggressiveness of the heuristic can be increased (e.g., write a block to the flash device when n/4 bits for the block in the bitmap are set, n<4, where n/m defines the heuristic or condition triggering writing to the flash device—such as when n=2 or 3 bits). When increasing the aggressiveness of the background copying, such as when n is equal to or greater than 3 for each block and only 3 bits are set for the block, one track (e.g., having bit map entry=0) of the block is rewritten unnecessarily. However, the tradeoff is an increased chance of reading the other 3 data tracks corresponding to the other 3 bits=1 from the flash device serving as the asynchronous mirror device.

It should also be noted that an embodiment may also adjust the foregoing heuristic alone, or in conjunction with one or more other criteria, to increase/decrease the aggressiveness of the background copy processing. For example, an embodiment may also adjust the time or frequency that the background copy processing is performed in accordance with a desired level of aggressiveness. For example, the background copy processing may be performed only when the DA is idle or DA utilization is below a specified threshold. The frequency and times at which the background copy processing may be performed may be increased to allow for the background copy processing to operate at other times besides when the DA is idle to increase the aggressiveness.

An embodiment may use bit map metadata to indicate which primary storage device is bound to a particular flash device serving as an asynchronous mirror device. When it is desired to utilize a flash device and bind the flash device to a primary storage device, an embodiment may accordingly update the metadata for the bitmap to indicate this new relationship. Thus, the bit map metadata may be characterized as a form of configuration data indicating current primary storage device to flash device bindings. The background copy process may examine the bit map metadata when performing processing to copy data. There may be a pool of flash devices serving as asynchronous mirror devices. The flash devices may be bound to disk devices or other magnetic storage devices that may be included as primary storage devices. The bit map metadata may be stored in a portion of global memory, non-volatile memory location, and the like. For example, the bit map metadata may be stored in GM or other portion of memory accessible to all processors and components performing processing using the techniques herein.

What will now be described are flowcharts summarizing processing that may be performed in an embodiment using the techniques herein.

Figure 6:
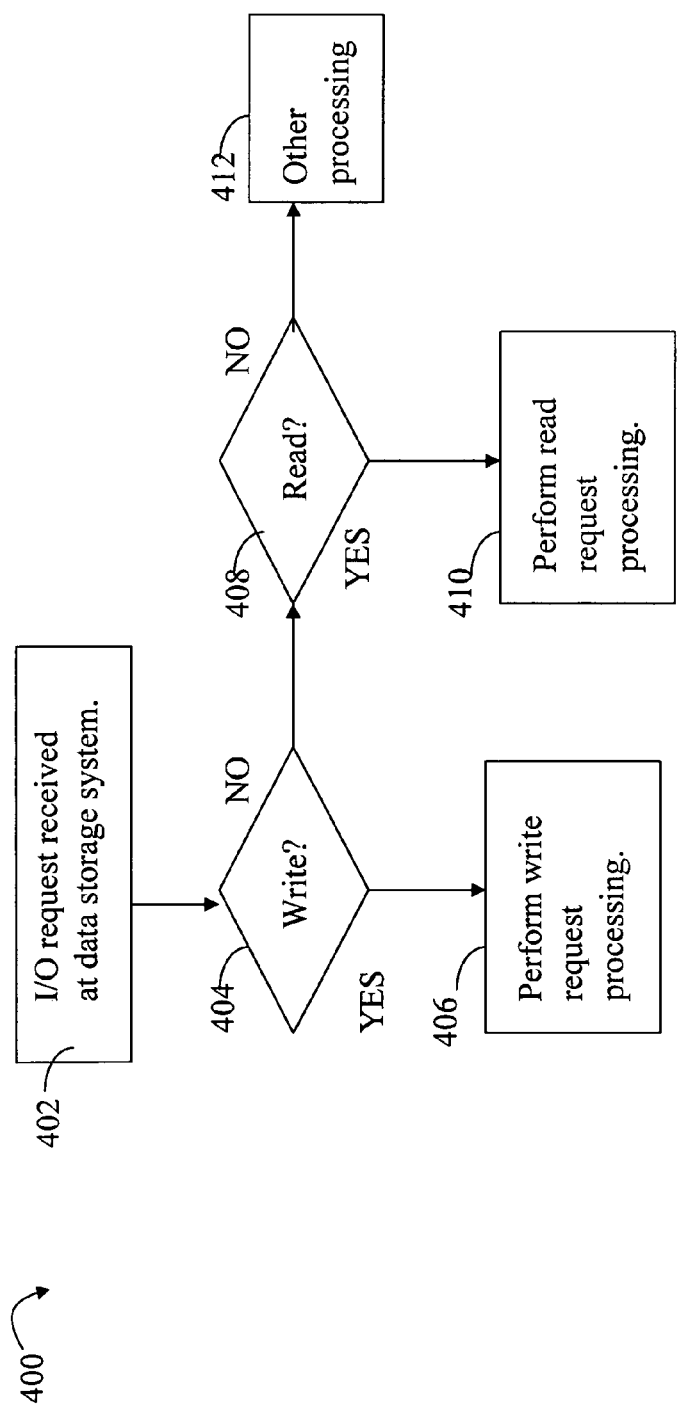
FIGS. 6-9 are flowcharts of processing steps that may be performed in an embodiment in connection with the techniques herein.

Referring to FIG. 6, shown is a flowchart of processing steps that may be performed in an embodiment using the techniques herein by a data storage system when processing an I/O request received. At step 402, the I/O request is received at the data storage system. The I/O request may be received from a host having connectivity to the data storage system such as illustrated and described in connection with FIG. 1. At step 404, the data storage system performs processing to determine whether the request is a write operation. If so, control proceeds to step 406 to perform write request processing. Otherwise, if step 404 evaluates to no, control proceeds to step 408 where a determination is made as to whether the request is a read operation. If step 408 evaluates to yes, control proceeds to step 410 to perform read request processing. If step 408 evaluates to no, control proceeds to step 412 to perform other processing for the received I/O request.

Figure 7:
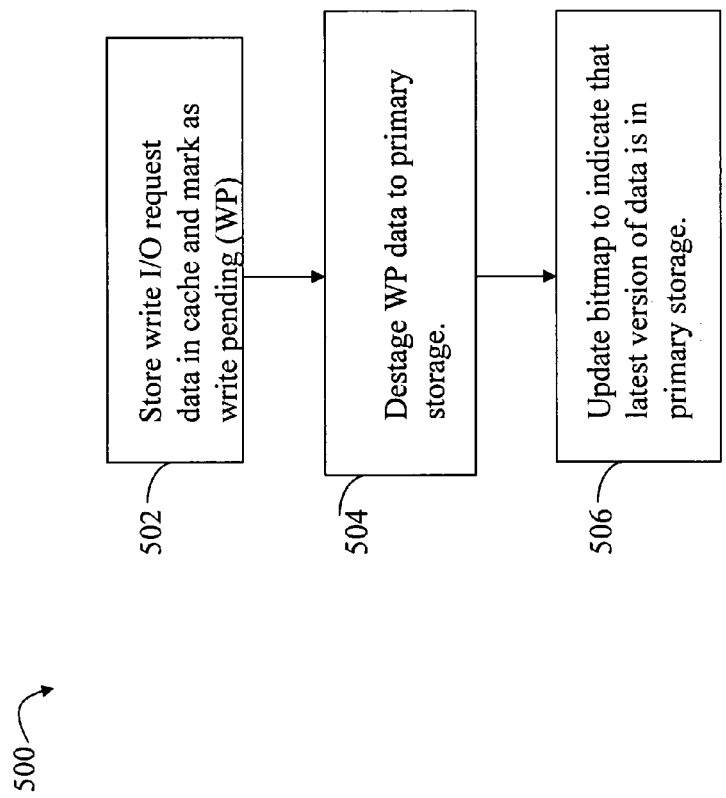

Referring to FIG. 7, shown is a flowchart of processing steps that may be performed in an embodiment in connection with write processing for an I/O request received at the data storage system. The flowchart 500 includes processing steps that may be performed in connection with step 406 of FIG. 6. At step 502, the write I/O request data is stored in cache and marked as write pending (WP). At some point later, step 504 is performed and the WP data from the cache is destaged to primary storage such as written to a disk device. At step 506, as part of processing performed after the WP data is destaged, the bit map entry for the destaged data is updated to indicate that the latest or current version of the data is in primary storage but not in the asynchronous mirror. In one embodiment, step 506 may result in the corresponding bit map entry being set to 1 as described elsewhere herein. Step 502 may be performed by an HA, FA or other front end component that may be included in an embodiment which receives I/O requests. Step 502 may include performing other processing, such as obtaining a cache slot for storing the write request data, and the like. An embodiment may have the DA servicing the device to which data is destaged perform steps 504 and 506.

Figure 8:
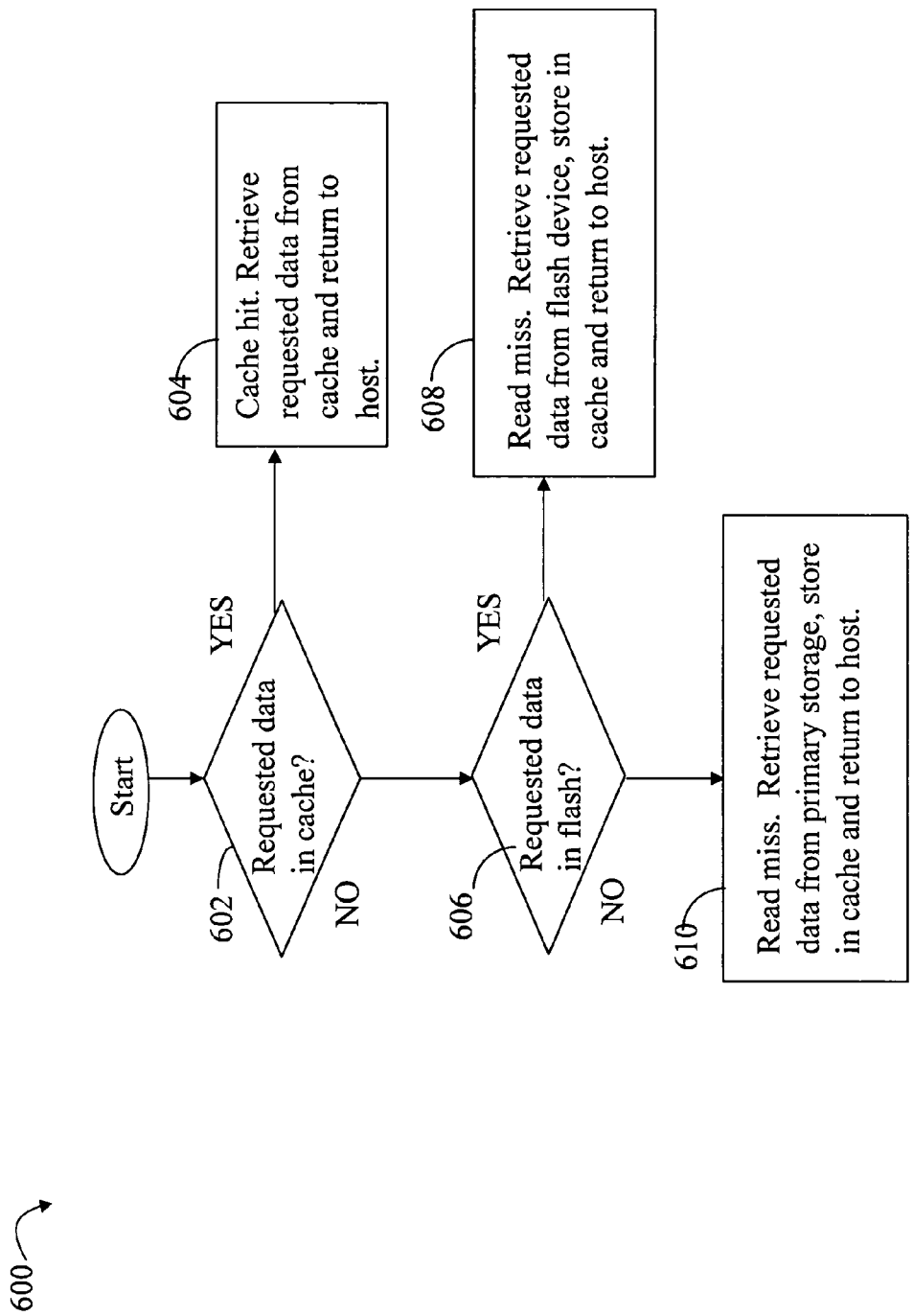

Referring to FIG. 8, shown is a flowchart of processing steps that may be performed in an embodiment in connection with read processing for an I/O request received at the data storage system. The flowchart 600 includes processing steps that may be performed in connection with step 410 of FIG. 6. At step 602, a determination is made as to whether the current copy of the requested read data is included in cache. If so, control proceeds to step 604 where it is determined that there is a cache hit. In step 604, the requested data is retrieved from the cache and returned to the host or other entity which issued the read request. If step 602 evaluates to no, there is a read cache miss and control proceeds to step 606. In step 606, a determination is made as to whether the current copy of the requested read data is in the flash device or other device serving as the asynchronous mirror device. If step 606 evaluates to yes, control proceeds to step 608 where read miss processing is performed and the requested data is retrieved from the flash device, stored in cache, and then returned to the host or other requesting entity. If step 606 evaluates to no, control proceeds to step 610 where read miss processing is performed and the current copy of the requested data is retrieved from primary storage, stored in cache, and returned to the host or other requesting entity.

The HA, FA or other front end component may retrieve data from cache on a cache hit and return the data to the host. If the data is not in cache, a request may be issued to the DA or other component to retrieve the data from the asynchronous mirror device or primary storage device.

Figure 9:
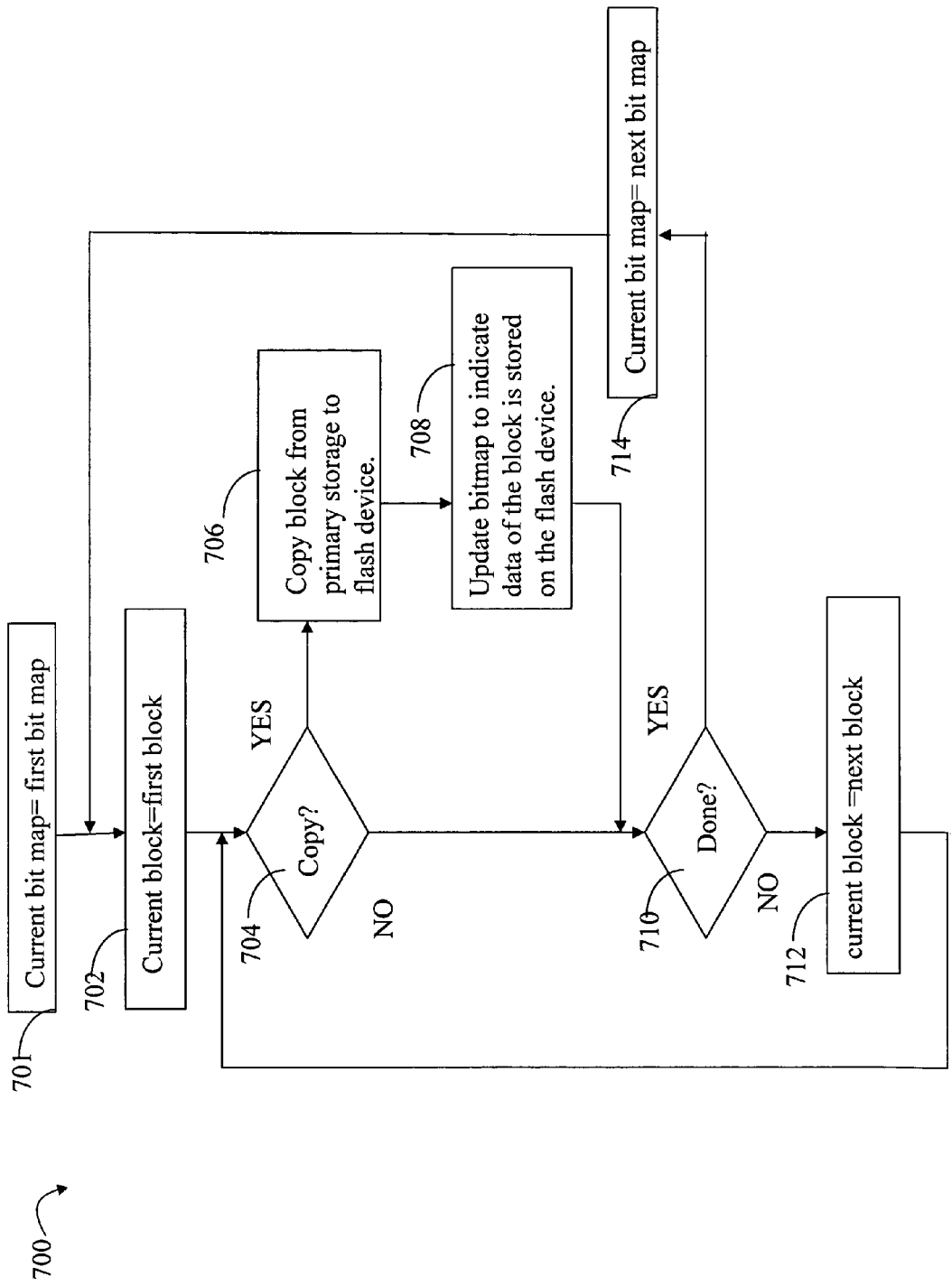

Referring to FIG. 9, shown is a flowchart of processing steps that may be performed in an embodiment in connection with performing the background copy processing in an embodiment using the techniques herein. The code of the background copy processing may be executed by a processor of the DA. It should be noted that the steps of flowchart 700 may process one or more bit maps where each bit map represents a primary storage device to asynchronous mirror device mapping. In one embodiment, a bit map may exist for each logical device of primary storage bound to a logical asynchronous mirror device. At step 701, a variable, current bit map, is set to the first bit map as may be indicated in the bit map metadata. At step 702, a variable, current block is set to the first block of the current bit map. At step 704, bit map entries corresponding to the first block are examined. At step 704, it is determined whether to copy the data of the current block from the primary storage device to the corresponding asynchronous mirror device. If step 704 evaluates to yes, control proceeds to step 706 where the block is copied from primary storage to the flash device or other device used as the asynchronous mirror device. At step 708, the bit map for the block just copied in step 706 is updated to indicate that the data of the block is stored on the flash device. In one embodiment, step 708 may include setting the bit map entries for the block to 0. Control proceeds from step 708 to step 710. If step 704 evaluates to no, control proceeds directly to step 710. At step 710, a determination is made as to whether the background copy processing for the current bit map has completed. If no, control proceeds to step 712 where current block is assigned the next block and control proceeds to step 704 to process the next block. If step 710 evaluates to yes and processing of the current bit map is complete, control proceeds to step 714 to process the next bit map. It should be noted that once all bit maps have been processed, the background copy processing of flowchart 700 may start again with the first bit map so that the bit maps are continuously processed by the back ground copy processing.

Step 704 processing may be performed in accordance with the heuristic as described herein indicating a threshold number of bit map entries for each block that must be 1 in order for step 704 to evaluate to yes. As described herein, an embodiment may utilize a configurable heuristic which may be initialized to a value which may be adjusted to be more or less aggressive with copying performed by the background copy processing. As described herein, a bit map entry having a value of 1 indicates that the current copy of the corresponding track of data is stored on a primary storage device and not on the flash device serving as the asynchronous mirror device. As such, a value of 1 in a bit map entry indicates that the associated track is to be copied to the asynchronous mirror device as may be determined in accordance with the heuristic used by the background copy processing.

In one embodiment as described herein, the primary storage devices may be disk devices and one or more of the primary storage devices may each be bound to an asynchronous mirror device that is a flash memory device. The primary storage devices and the asynchronous mirror devices may be included in the data storage system such as the same data storage array. As will be appreciated by those skilled in the art, other variations from examples described herein for purposes of illustration are possible and may be used in connection with the techniques herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable. This is illustrated in more detail in following figures.

Figure 10:
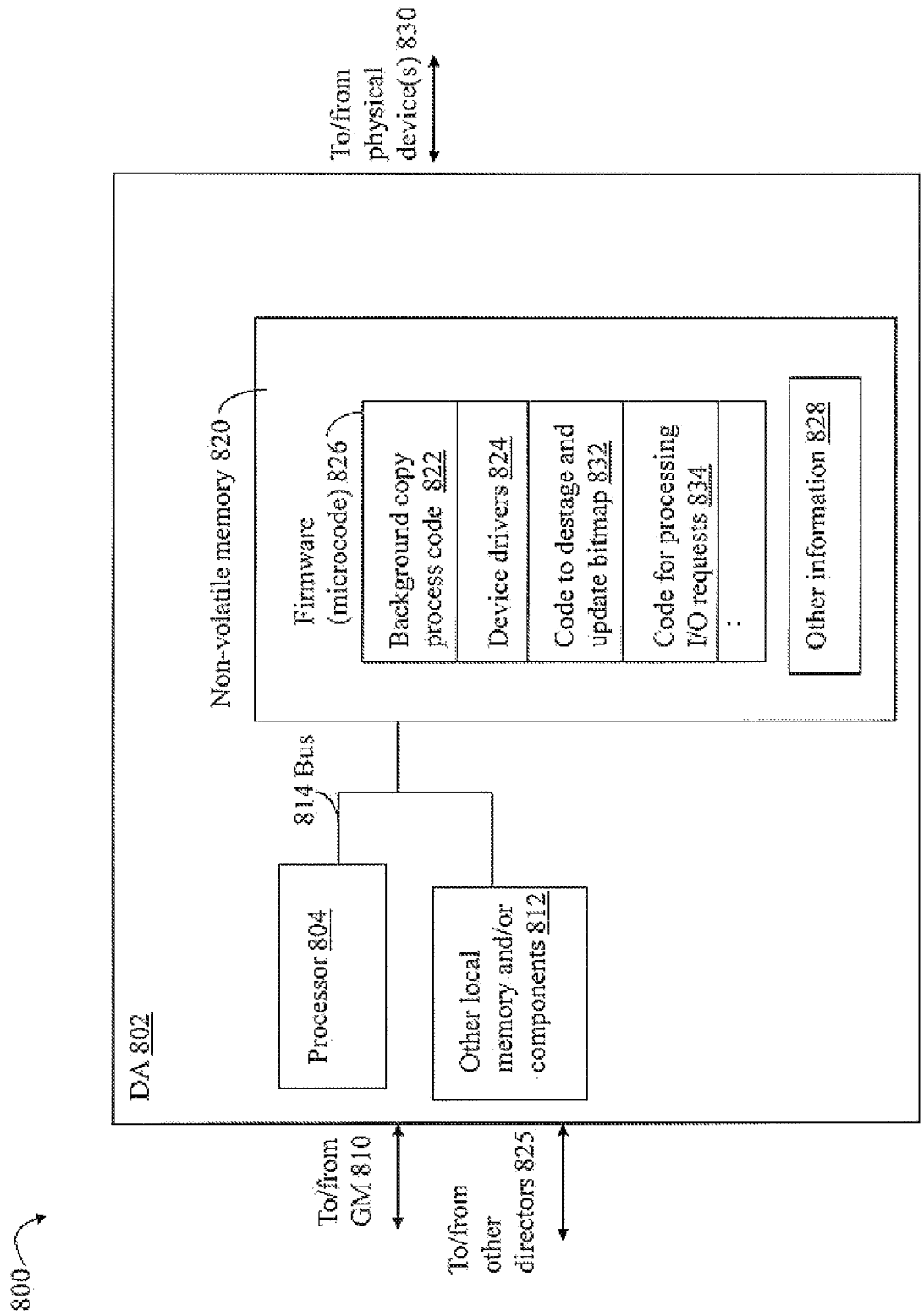
FIG. 10 is an example illustrating additional detail of components that may be included in a DA in an embodiment performing the techniques herein.

Referring to FIG. 10, shown is an example illustrating a DA in more detail as may be included in an embodiment using the techniques herein. The example 800 illustrates a DA 802 including a processor 804, non-volatile memory (NVM) 820 and other local memory and/or components 812 which communicate over an internal bus 814. The components included in 802 may be characterized as local to the DA 802. The DA 802 may communicate with the global memory (GM) as illustrated by 810, write/read data to/from the physical devices as illustrated by 830, and communicate with other directors as illustrated by 825. It should be noted an embodiment may include the CM 38 of FIG. 2 and use the CM 38 in connection with communicating with other directors. The NVM 820 may include microcode or firmware 826. The firmware 826 may include background copy process code 822, device drivers 824, code to destage data and update the bit map 832, code for performing other processing in connection with I/O requests 834, and other code used by the DA. The background copy process code 822 and code included in 832 to update the bit map as part of the destaging process may include code for performing the processing described herein by the DA. The code of 834 may include code which performs other processing in connection with servicing I/O requests such as, for example, reading data from a device and storing it in cache in connection with read operations, and the like. The NVM 820 may also include other information 828, such as code and/or data used by the DA.

Figure 11:
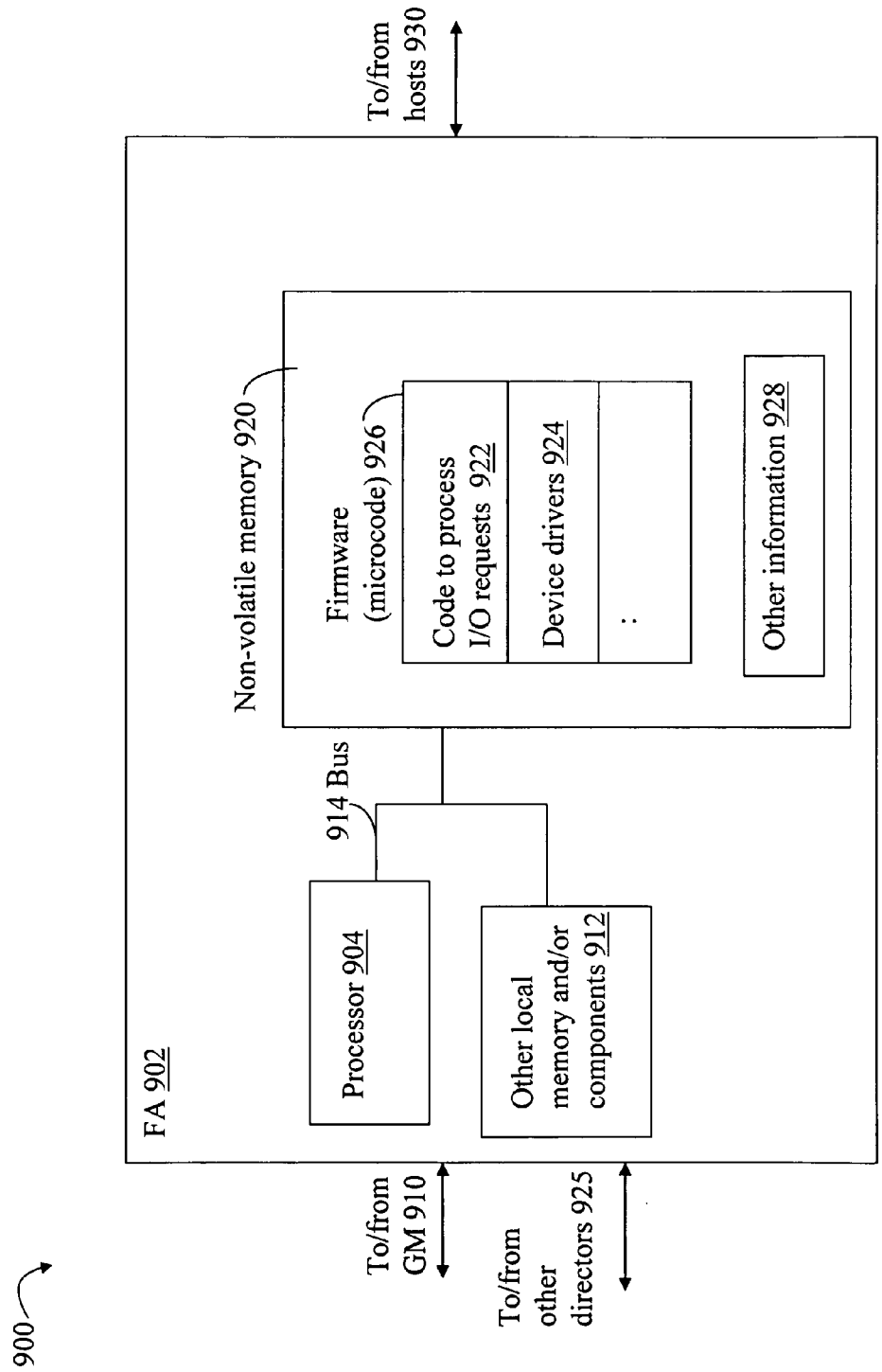
FIG. 11 is an example illustrating additional detail of components that may be included in an FA in an embodiment performing the techniques herein.

Referring to FIG. 11, shown is an example illustrating a FA in more detail as may be included in an embodiment using the techniques herein. The example 900 illustrates FA 902 including a processor 904, non-volatile memory (NVM) 920 and other local memory and/or components 912 which communicate over an internal bus 914. The components included in 902 may be characterized as local to the FA 902. The FA 902 may communicate with the global memory (GM) as illustrated by 910, communicate with the host as illustrated by 930, and communicate with other directors as illustrated by 925. It should be noted an embodiment may include the CM 38 of FIG. 2 and use the CM 38 in connection with communicating with other directors. The NVM 920 may include microcode or firmware 926. The firmware 926 may include code to process received I/O requests 922, device drivers 924, and other code used by the FA. The code to process I/O requests 922 may include code for performing processing described herein by the FA. Such processing may include, for example, processing read and write requests from a host, determining whether the data for a read request is stored on an asynchronous mirror such as a flash device, and the like. The NVM 920 may also include other information 928, such as code and/or data used by the FA. It should be noted that although an FA is illustrated in more detail in the example 900, other front end components, such as HAs, which receive I/O requests from the hosts or other requesting entities may similarly include components as illustrated in the example 900.

It should be noted that embodiments have been described herein where particular processing is performed by the HA or FA, and DA. However, the techniques herein may be performed by any general processing unit or component in a data storage system. The processing as described herein may be distributed among multiple components and partitioned differently than as described herein. For example, rather than have the DA manage and maintain the bit map and/or include code for the background copy processing, an embodiment may have the HA or FA perform such processing and may use the GM or other techniques known in the art to facilitate communications with the DA and other components in connection with such processing.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a data storage system in connection with processing an I/O request, the method including:
   receiving the I/O request;
   determining whether the I/O request is a write request; and
   if the I/O request is a write request, performing write request processing including:
     copying write request data of the write request to cache;
     destaging the write request data from the cache to a primary storage device; and
     copying, in accordance with a heuristic, the write request data from the primary storage device to an asynchronous mirror device including an asynchronous copy of data from the primary storage device, wherein said asynchronous mirror device is write disabled with respect to received write requests requesting to write data thereto, said asynchronous mirror device used for servicing data requested in connection with read requests upon the occurrence of a cache miss, wherein said heuristic specifies a threshold amount of a block having a current copy which is stored on the primary storage device and not on the asynchronous mirror device and said copying copies a first block of the write request data from the primary storage device to the asynchronous mirror device when said threshold amount of the first block has a current copy stored on the primary storage device and not on the asynchronous mirror device.

2. The method of claim 1, wherein, if the I/O request is a read request, read request processing is performed, said read request processing including:
   determining whether read request data of the read request is in cache;
   if a current copy of said read request data is not in cache, determining whether the current copy of the read request data is stored in the asynchronous mirror device;
   if the current copy of the read request data is stored in the asynchronous mirror device, retrieving the current copy from the asynchronous mirror device to service the read request, and otherwise, if the current copy of the read request data is not stored in the asynchronous mirror device, retrieving the current copy from the primary storage device.

3. The method of claim 1, wherein the primary storage device is a disk device and the asynchronous mirror device is a flash device comprising flash memory using a flash memory technology.

4. The method of claim 1, wherein an amount of time to read data from the primary storage device is greater than another amount of time to read data from the asynchronous mirror device.

5. The method of claim 1, wherein said copying is performed using a background copy operation, and after destaging the write request data from cache to the primary storage device, a bit map is updated to indicate that a current copy of the write request data is stored in the primary storage device and not in the asynchronous mirror device, and after said copying copies the write request data to the asynchronous mirror device, the bit map is updated to indicate that the current copy of the write request data is stored in the primary storage device and the asynchronous mirror device.

6. The method of claim 1, wherein the data storage system includes a plurality of primary storage devices, one or more of the primary storage devices each being selectively bound to a corresponding asynchronous mirror device.

7. The method of claim 6, wherein a first portion of the primary storage devices are bound to corresponding asynchronous mirror devices and a second portion of the primary storage devices different than the first portion which are not bound to corresponding asynchronous mirror devices, each primary storage device in said first portion providing data to an application having a higher quality of service level than another application having data stored on one of the primary storage devices included in the second portion.

8. The method of claim 6, wherein specifying a binding of a primary storage device to a corresponding asynchronous mirror device is configurable.

9. The method of claim 8, wherein the binding is specified using metadata for a bit map associated with the binding, said bit map being updated after said destaging and after said copying to indicate whether a current copy of data portions of the primary storage device are stored on the corresponding asynchronous mirror device as well as the primary storage device.

10. The method of claim 9, wherein said bit map is used in connection with processing an I/O request that is a read request for the primary storage device to determine whether a current copy of read request data of the read request is stored in the corresponding asynchronous mirror device, and if the current copy is stored in the corresponding asynchronous mirror device, retrieving the current copy from the corresponding asynchronous mirror device to service the read request, and otherwise, if the current copy of the read request data is not stored in the corresponding asynchronous mirror device, retrieving the current copy from the primary storage device.

11. The method of claim 6, wherein the plurality of primary storage devices are each selectively bound to one of a plurality of flash memory devices, said flash memory devices including at least one device that is a multi-level cell flash memory device and at least one device that is a single level cell flash memory device.

12. A method executed in a data storage system in connection with processing an I/O request, the method including:
receiving the I/O request;
determining whether the I/O request is a write request; and
if the I/O request is a write request, performing write request processing including:
copying write request data of the write request to cache;
destaging the write request data from the cache to a primary storage device; and
copying, in accordance with a heuristic, the write request data from the primary storage device to an asynchronous mirror device including an asynchronous copy of data from the primary storage device, wherein said asynchronous mirror device is write disabled with respect to received write requests requesting to write data thereto, said asynchronous mirror device used for servicing data requested in connection with read requests upon the occurrence of a cache miss, wherein said copying is performed using a background copy operation, and after destaging the write request data from cache to the primary storage device, a bit map is updated to indicate that a current copy of the write request data is stored in the primary storage device and not in the asynchronous mirror device, and after said copying copies the write request data to the asynchronous mirror device, the bit map is updated to indicates that the current copy of the write request data is stored in the primary storage device and the asynchronous mirror device, and wherein the bit map includes an entry for each partition of data of the primary storage device, and the background copy operation copies data to the asynchronous mirror device in chunks each having a size of a block, a size of said block being determined in accordance with internal processing performed on the asynchronous mirror device for garbage collection processing and wear leveling, said size being a multiple number of partitions of the primary storage device.

13. The method of claim 12, wherein said heuristic indicates, for each block, a threshold number of entries in the bit map so that each of said threshold number of entries has to have a predefined value for copying of said each block to the asynchronous mirror device to be performed, and wherein each block corresponds to a predetermined set of one or more partitions of the primary storage device so that said one or more partitions are always written in a same block.

14. A data storage system comprising:
a memory;
a cache;
a plurality of primary storage devices, said plurality of primary storage devices including disk devices;
a plurality of asynchronous mirror devices, said plurality of asynchronous mirror devices including flash memory devices, wherein at least one of the plurality of primary storage devices is bound to one of said plurality of asynchronous mirror devices;
bit map metadata stored in the memory and indicating that each of said at least one of the plurality of primary storage devices is bound to one of said plurality of asynchronous mirror devices;
a bit map stored in the memory and associated with each binding represented in the bit map metadata, said each binding representing a binding of a first primary storage device to a first asynchronous mirror device, said bit map including bit map entries corresponding to portions of said first primary storage device, each of said bit map entries indicating whether a current copy of a corresponding portion of data of the first primary storage device is included in both the first primary storage device and the first asynchronous mirror device, or whether the current copy is included in the first primary storage device and not the first asynchronous mirror device; and a computer readable medium comprising executable code store thereon for processing a write request to write data to the first primary storage device, the executable code for processing a write request including code for:
copying write request data of the write request to the cache;
destaging the write request data to the first primary storage device; and
copying, in accordance with a heuristic, the write request data from the first primary storage device to the first asynchronous mirror device including an asynchronous copy of data from the first primary storage device, wherein said first asynchronous mirror device is write disabled with respect to received write requests requesting to write data thereto, said first asynchronous mirror device used for servicing data requested in connection with read requests upon the occurrence of a cache miss, wherein said heuristic specifies a threshold amount of a block having a current copy which is stored on the first primary storage device and not on the first asynchronous mirror device and said copying copies a first block of the write request data from the first primary storage device to the first asynchronous mirror device when said threshold amount of the first block has a current copy stored on the first primary storage device and not on the first asynchronous mirror device.

15. The data storage system of claim 14, wherein the computer readable medium includes executable code stored thereon for processing a read request, said executable code for processing a read request including executable code for:
determining whether read request data of the read request is in cache;
if said read request data is not in cache, determining whether the read request data is stored in one of said plurality of asynchronous mirror devices; and
if the read request data is stored in one of the plurality of asynchronous mirror devices, retrieving data therefrom to service the read request, and otherwise, if the read request data is not stored in one of the plurality of asynchronous mirror devices, retrieving data from one of the plurality of primary storage devices including said read request data.

16. The data storage system of claim 14, wherein said executable code for copying is performed in connection with a background copy operation, and after said destaging, said bit map associated with said each binding is updated to indicate that a current copy of the write request data is stored in the first primary storage device and not in the first asynchronous mirror device, and after said copying copies the write request data to the first asynchronous mirror device, the bit map is updated to indicate that the current copy of the write request data is stored in the first primary storage device and the first asynchronous mirror device.

17. The data storage system of claim 16, wherein said determining whether the read request data is stored in one of said plurality of asynchronous mirror devices uses one or more bit maps, each bit map corresponding to one binding included in said bit map metadata indicating that one of the plurality of primary storage devices is bound to one of the asynchronous mirror devices.

18. A computer readable medium comprising executable code stored thereon for processing an I/O request in a data storage system, the computer readable medium comprising executable code for:
receiving the I/O request;
determining whether the I/O request is a write request; and
if the I/O request is a write request, performing write request processing including:
copying write request data of the write request to cache;
destaging the write request data from the cache to a primary storage device; and
copying, in accordance with a heuristic, the write request data from the primary storage device to an asynchronous mirror device including an asynchronous copy of data from the primary storage device, wherein said asynchronous mirror device is write disabled with respect to received write requests requesting to write data thereto, said asynchronous mirror device used for servicing data requested in connection with read requests upon the occurrence of a cache miss, wherein said heuristic specifies a threshold amount of a block having a current copy which is stored on the primary storage device and not on the asynchronous mirror device and said copying copies a first block of the write request data from the primary storage device to the asynchronous mirror device when said threshold amount of the first block has a current copy stored on the primary storage device and not on the asynchronous mirror device.

19. A data storage system comprising:
a memory;
a cache;
a plurality of primary storage devices, said plurality of primary storage devices including disk devices;
a plurality of asynchronous mirror devices, said plurality of asynchronous mirror devices including flash memory devices, wherein at least one of the plurality of primary storage devices is bound to one of said plurality of asynchronous mirror devices;
bit map metadata stored in the memory and indicating that each of said at least one of the plurality of primary storage devices is bound to one of said plurality of asynchronous mirror devices;
a bit map stored in the memory and associated with each binding represented in the bit map metadata, said each binding representing a binding of a first primary storage device to a first asynchronous mirror device, said bit map including bit map entries corresponding to portions of said first primary storage device, each of said bit map entries indicating whether a current copy of a corresponding portion of data of the first primary storage device is included in both the first primary storage device and the first asynchronous mirror device, or whether the current copy is included in the first primary storage device and not the first asynchronous mirror device; and
a computer readable medium comprising executable code store thereon for processing a write request to write data to the first primary storage device, the executable code for processing a write request including code for:
copying write request data of the write request to the cache;
destaging the write request data to the first primary storage device; and
copying, in accordance with a heuristic, the write request data from the first primary storage device to the first asynchronous mirror device including an asynchronous copy of data from the first primary storage device, wherein said first asynchronous mirror device is write disabled with respect to received write requests requesting to write data thereto, said first asynchronous mirror device used for servicing data requested in connection with read requests upon the occurrence of a cache miss, wherein said copying data from the first primary storage device to the first asynchronous mirror device copies data in blocks having a size determined in accordance with wear leveling and garbage collection processing performed internally on said first asynchronous mirror device.

20. The data storage system of claim 19, wherein said heuristic used in connection with said copying data indicates a threshold amount of a block having a current copy which is stored in said first primary storage device and not in said first asynchronous mirror device.

* * * * *